United States Patent
Kanga et al.

(10) Patent No.: US 9,852,342 B2
(45) Date of Patent: Dec. 26, 2017

(54) SURVEILLANCE SYSTEM

(71) Applicant: iOmniscient Pty Ltd, Gordon, New South Wales (AU)

(72) Inventors: Rustom Adi Kanga, Gordon (AU); Ivy Lai Chun Li, Gordon (AU)

(73) Assignee: IOMNISCIENT PTY LTD, Gordon, NSW (AU)

( * ) Notice: Subject to any disclaimer, the term of this patent is extended or adjusted under 35 U.S.C. 154(b) by 64 days.

(21) Appl. No.: 14/766,512

(22) PCT Filed: Feb. 7, 2014

(86) PCT No.: PCT/AU2014/000098
§ 371 (c)(1),
(2) Date: Aug. 7, 2015

(87) PCT Pub. No.: WO2014/121340
PCT Pub. Date: Aug. 14, 2014

(65) Prior Publication Data
US 2015/0379355 A1 Dec. 31, 2015

(30) Foreign Application Priority Data
Feb. 7, 2013 (AU) ................................ 2013900392

(51) Int. Cl.
*G06K 9/00* (2006.01)
*G08B 13/196* (2006.01)
(Continued)

(52) U.S. Cl.
CPC ...... *G06K 9/00711* (2013.01); *G06K 9/00476* (2013.01); *G06K 9/00718* (2013.01);
(Continued)

(58) Field of Classification Search
CPC .... H04N 7/188; H04N 7/181; G06K 9/00711; G06K 9/00771; G06K 9/00718;
(Continued)

(56) References Cited

U.S. PATENT DOCUMENTS 8,378,891 B2 * 2/2013 Murray .................. G01S 5/021
342/450
8,509,963 B1 * 8/2013 Barnes ................ G06F 11/3013
340/540

(Continued)

FOREIGN PATENT DOCUMENTS

WO 2009/135253 A1 11/2009

OTHER PUBLICATIONS

International Search Report and Written Opinion of the International Searching Authority for International Application No. PCT/AU2014/000098 dated Mar. 24, 2014.

*Primary Examiner* — Shefali Goradia
(74) *Attorney, Agent, or Firm* — Fitch Even Tabin & Flannery LLP

(57) ABSTRACT

An automated surveillance system is disclosed in this specification. The system comprises a computing system arranged to receive a plurality of surveillance feeds from a surveillance network and detect characteristics of the surveillance feeds that are indicative of categorized events. Each of the surveillance feeds has a geospatial reference tag that identifies the origin of content contained within the feed. The surveillance system determines a response reaction to detected events and identifies potential response units in the vicinity of the surveillance location using the geospatial reference tag.

36 Claims, 8 Drawing Sheets

(51) Int. Cl.
    *G08B 25/00*     (2006.01)
    *G08B 29/18*     (2006.01)
    *H04N 7/18*     (2006.01)

(52) U.S. Cl.
    CPC ... *G06K 9/00771* (2013.01); *G08B 13/19671* (2013.01); *G08B 25/006* (2013.01); *G08B 29/188* (2013.01); *H04N 7/181* (2013.01); *H04N 7/188* (2013.01); *G06K 2009/00738* (2013.01)

(58) Field of Classification Search
    CPC ..... G06K 9/00476; G06K 2009/00738; G08B 25/006; G08B 29/188; G08B 13/19671
    See application file for complete search history.

(56) References Cited

U.S. PATENT DOCUMENTS

| | | | |
|---|---|---|---|
| 8,799,820 B2 * | 8/2014 | Pascal | G06Q 10/107 375/240 |
| 9,449,218 B2 * | 9/2016 | Smith | G06K 9/00302 |
| 2010/0013628 A1 | 1/2010 | Monroe | |
| 2010/0026802 A1 | 2/2010 | Titus et al. | |

* cited by examiner

SURVEILLANCE SYSTEM

CROSS-REFERENCE TO RELATED APPLICATION

This application is a U.S. national phase application of International Application No. PCT/AU2014/000098, filed Feb. 7, 2014, designating the United States, which claims priority to Australian Patent Application No. 2013900392, filed Feb. 7, 2013, both of which are incorporated by reference herein in their entirety.

FIELD OF THE INVENTION

The present invention relates to an automated system and method for responding to events captured by a surveillance network.

BACKGROUND

Electronic surveillance is becoming increasingly widespread. Modern surveillance networks may operate in a diverse range of applications. Some examples include open public spaces (including streets and parks), public and private buildings, essential infrastructure (such as railway stations and around bridges), airports, factories and military bases.

Streaming video (such as real time CCTV footage) is one form of surveillance feed that is often incorporated in surveillance networks. Other forms of surveillance feed may include audio streams, chemical detection units (such as vapor or trace particle detectors) and environment sensors (such as strain gauges, pressure sensors and temperature sensors).

Electronic surveillance is typically monitored continuously in real time by an operator (such as a security guard or local operator). An individual operator is often required to monitor several surveillance feeds (usually video footage from multiple cameras). The operator is responsible for identifying incidents and determining how to respond to each incident.

SUMMARY OF INVENTION

The present invention provides an automated surveillance system comprising:

a computing system arranged to receive a plurality of surveillance feeds from a surveillance network, each of the surveillance feeds having a geospatial reference tag that identifies a corresponding surveillance location, a profiling engine that detects characteristics of the surveillance feeds that are indicative of categorized events and classifies the identified characteristics in event records, and a response module that determines a response reaction to events documented in event records using a response index allocated to corresponding event categories.

In an embodiment, the system comprises a cognition engine that generates incident reports from combinations of events documented in the event records, each of the incident reports being derived from event combinations that are indicative of predefined incidents.

In an embodiment, the system comprises a response evaluation engine that determines response reactions for incident reports using a response index allocated to the predefined incident.

In an embodiment, the system comprises a supervision module that samples the surveillance feeds and generates temporal characteristic profiles, the supervision module transferring the temporal characteristic profiles being to the profiling engine.

In an embodiment, the system comprises a command module that monitors the geospatial position of a plurality of designated response units and nominates response units that satisfy the response reaction determined by the response module based on proximity to a corresponding surveillance location.

In an embodiment, the system comprises a dispatch module that monitors response unit availability and dispatches response instructions to available response units nominated by the command module.

In an embodiment, the system comprises a prioritization module that assesses current event records and assigns a prioritization rating to pending responses reactions, the prioritization rating defining a response priority for a corresponding event, the prioritization module deriving the prioritization rating from the response index allocated to a corresponding event category.

In an embodiment, the system comprises a network interface that receives surveillance feeds from a plurality of surveillance nodes within the surveillance network.

In an embodiment, the system comprises a tracking engine that identifies response units in the geographical vicinity of designated surveillance locations.

In an embodiment, the response module derives event response reactions from the event record classifications generated by the profiling engine.

In a second aspect, the present invention provides an automated response process comprising:

a computing system receiving a plurality of surveillance feeds from a surveillance network, each of the surveillance feeds having a geospatial reference tag that identifies a corresponding surveillance location, the computing system detecting characteristics of the surveillance feeds that are indicative of categorized events and classifying the identified characteristics in event records, the computing system determining a response reaction to events documented in event records using a response index allocated to corresponding event categories and identifying response units in the vicinity of corresponding surveillance locations that are capable of responding to the events.

In an embodiment, the computing system generates incident reports from combinations of events documented in the event records, each of the incident reports being derived from event combinations that are indicative of predefined incidents.

In an embodiment, the computing system determines response reactions for incident reports using a response index allocated to the predefined incident.

In an embodiment, the computing system samples the surveillance feeds and generates temporal characteristic profiles.

In an embodiment, the computing system monitors the geospatial position of a plurality of designated response units and nominates potential response units that satisfy the response reaction determined for an event based on proximity to a corresponding surveillance location.

In an embodiment, the computing system monitors response unit availability and dispatches response instructions to nominated response units that are available.

In an embodiment, the computing system assesses current event records and assigns a prioritization rating to pending response reactions, the prioritization rating being derived from the response index allocated to a corresponding event category and defining a response priority for a corresponding event.

In an embodiment, the computing system receives surveillance feeds from a plurality of surveillance nodes.

In a third aspect, the present invention provides an automated response method comprising a computing system generating an incident report from a plurality of individual events detected in a surveillance feed, and the computing system determining a response reaction to the incident report.

In an embodiment, the computing system receives a geospatial reference tag that identifies a surveillance location for a corresponding surveillance feed.

In an embodiment, the computing system detects characteristics of the surveillance feed that are indicative of categorized events and classifying the identified characteristics in event records.

In an embodiment, the computing system monitors the geospatial position of a plurality of designated response units and selecting potential response units that satisfy the response reaction based on proximity to a corresponding surveillance location.

In an embodiment, the computing system samples the surveillance feed and generating temporal characteristic profiles.

In an embodiment, the computing system generates individual incident reports from combinations of events that are indicative of predefined incidents.

In an embodiment, the computing system assigns each of the incident reports a prioritization rating that is derived from a response index allocated to a corresponding predefined incident, the prioritization rating defining a response priority for the incident.

In an embodiment, the computing system receives surveillance feeds from a plurality of surveillance locations and/or surveillance devices.

In a forth aspect, the present invention provides an automated surveillance system comprising a computing system arranged to receive a plurality of surveillance feeds from a surveillance network, and having an analysis engine arranged to aggregate and analyse information from a plurality of surveillance feeds to determine one or more incidents, and to determine a response to the one or more incidence In an embodiment, the system comprises a profiling engine that detects characteristics of the surveillance feeds that are indicative of categorized events and classifies the characteristics in event records.

In an embodiment, the system comprises a response module that determines a response to events documented in event records and identifies response units in the vicinity of a corresponding surveillance location.

In an embodiment, the system comprises a cognition engine that generates incident reports from combinations of events documented in the event records, each of the incident reports being derived from event combinations that are indicative of predefined incidents.

In an embodiment, the system comprises a response evaluation engine that determines response reactions for incident reports using a response index allocated to the predefined incident.

In an embodiment, the system comprises the system comprises a supervision module that samples the surveillance feeds and generates temporal characteristic profiles, the supervision module transferring the temporal characteristic profiles to the profiling engine.

In an embodiment, the system comprises a command module that monitors the geospatial position of a plurality of designated response units and nominates response units capable of responding to the one or more incidents based on proximity to a surveillance location.

In an embodiment, the system comprises a dispatch module that monitors response unit availability and dispatches response instructions to available response units nominated by the command module.

In an embodiment, the system comprises a prioritization module that assesses current event records and assigns a prioritization rating to pending responses, the prioritization rating defining a response priority for a corresponding event, the prioritization module deriving the prioritization rating from a response index allocated to a corresponding event category.

In an embodiment, the system comprises a network interface that receives surveillance feeds from a plurality of surveillance nodes and distributes the surveillance feeds to the profiling engine.

BRIEF DESCRIPTION OF THE DRAWINGS

Embodiments of the invention are described in this specification (by way of example) with reference to the accompanying drawing, in which.

DETAILED DESCRIPTION

Figure 1:
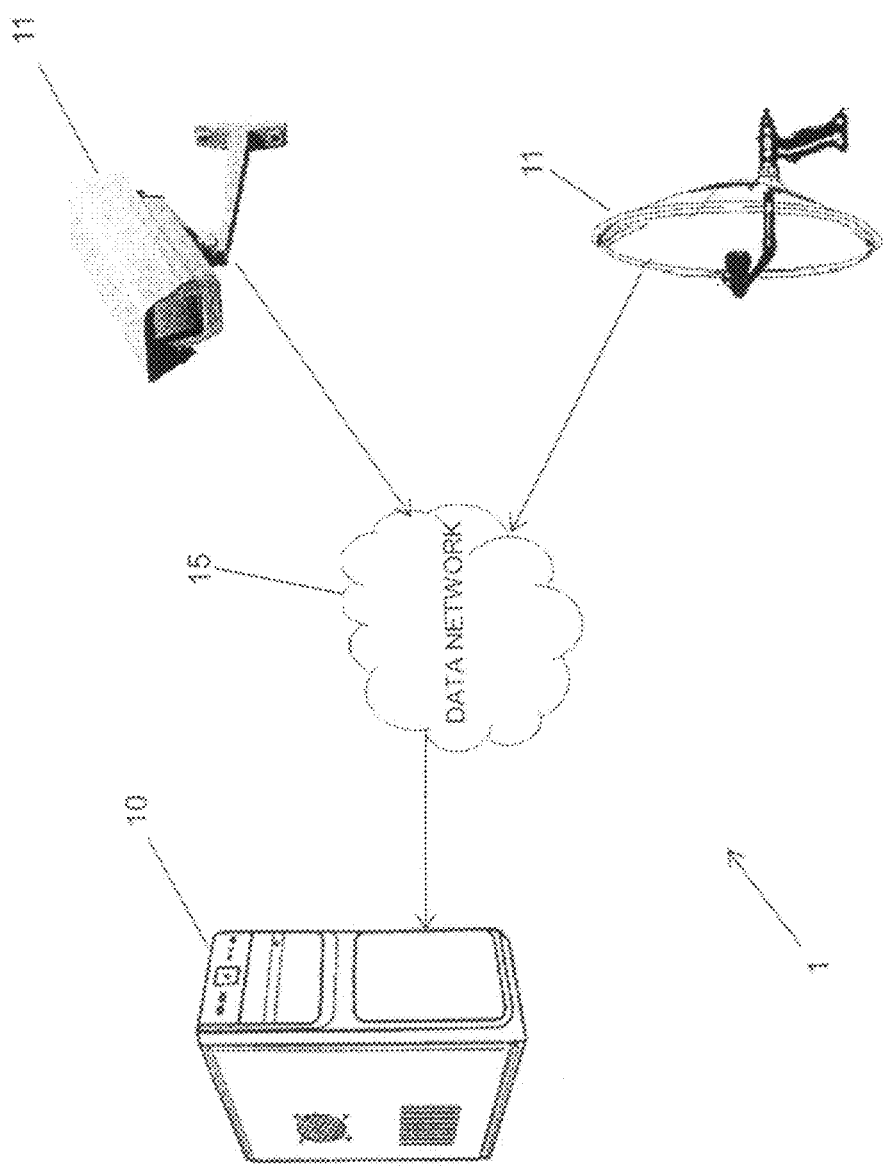
FIG. 1 is a schematic representation of a surveillance network according to an embodiment of the invention.

An embodiment of an automated surveillance system is disclosed in this specification. The system comprises one or more processors that cooperate in a 'computing system' to monitor a plurality of surveillance feeds and detect predefined events. The system is also capable of coordinating a response to detected events and related incidents. The computing system may comprise several distinct computers that interact to implement the function of the surveillance system.

The system receives surveillance feeds from a plurality of nodes organized in a surveillance network. Typical surveillance nodes include video cameras, still cameras, audio microphones, chemical trace detection units and environmental sensors. The surveillance system analyses each of the received feeds and detects characteristics that are indicative of categorized events. Detected events are classified in event records that the system stores in non-volatile memory.

The surveillance system analyses event records with similar temporal and spatial characteristics to determine whether the individual records are linked to a common incident. For example, a crash event (such as a car crash) and subsequent fire event detected in close spatial and temporal proximity are likely to be linked to a common crash incident. The surveillance system generates incident reports from combinations of events that are indicative of predefined incidents.

The disclosed system is capable of determining a response reaction to isolated events and consolidated incidents. The response reaction is typically determined from a response index allocated to predefined event and incident categories. The event categories, predefined incidents and response indices are typically stored in a lookup table or similar data collection within non-volatile memory. The surveillance system is also capable of dispatching response units to an event or incident if the response reaction indicates that intervention is desirable.

Each of the surveillance feeds analyzed by the system is tagged with a geospatial reference. The geospatial reference defines where the feed was generated (termed the 'surveillance location'). The surveillance system facilitates manual association of stationary nodes (such as street cameras) with corresponding geospatial locations during node initialization via a user interface. Dynamic surveillance nodes (such as dashboard cameras in patrol vehicles) typically transmit a geospatial reference (such as GPS co-ordinate) to the surveillance system with the corresponding surveillance feed.

The surveillance system uses the geospatial reference of the surveillance feeds to identify potential response units during co-ordination of a response reaction. Typical response units include emergency services (police, fire and ambulance services), road crews, parking wardens, tow truck operators, security personal and cleaners. The system monitors the geospatial position of designated response units and nominates potential respondents that satisfy the determined response reaction. Designated response units are typically registered with the system for monitoring. Response unit nominations can be prioritized to reflect proximity to the geospatial location where an event or incident is detected.

A schematic representation of a surveillance network 1 according to an embodiment of the invention is presented in FIG. 1. The illustrated surveillance network 1 comprises a plurality of surveillance nodes 11. The surveillance nodes 11 include a CCTV camera and long range microphone. Other forms of surveillance node 11 include still cameras, chemical detection units (such as vapor or trace particle detectors) and environmental indicators (such as strain gauges, pressure sensors and temperature sensors.

Each surveillance node 11 produces an independent data feed. An automated surveillance system 10 manages the surveillance data feeds produced by the illustrated surveillance network 1. The surveillance nodes 11 are connected to a data network 15. The data network 15 connects the individual surveillance nodes 11 to the automated surveillance system 10. The surveillance nodes 11 each transmit a surveillance feed to the surveillance system 10. Non-stationary surveillance nodes may also transmit a geospatial reference (such as GPS or mobile network triangulation co-ordinates) that identifies a corresponding surveillance location. The data network 15 facilitates transmission of the surveillance feeds from a corresponding surveillance location (the geographical location where the corresponding surveillance node is positioned) to the centralized system 10.

The surveillance feeds captured by existing surveillance networks include video footage from motion cameras (such as CCTV cameras), still images, audio streams, chemical analysis from detection units (such as vapor or trace particle detectors) and environmental indicators (such as strain gauges, pressure sensors and temperature sensors). The surveillance system 10 processes the received surveillance feeds and co-ordinates a response to detected events. The surveillance feeds are tagged with a geospatial reference that defines a corresponding surveillance location. The geospatial reference may be 'hardcoded' or dynamic depending on the characteristics of the corresponding surveillance node. The surveillance system 10 uses the geospatial reference to locate events and identify possible response units during co-ordination of a response.

Response units are typically registered with the system 10 and can include emergency services (police, fire and ambulance services), road crews, parking wardens, tow trucks, security personal and cleaners. The system 10 is capable of monitoring the position of mobile response units (such as police units and tow trucks) using GPS tracking, mobile network triangulation or other similar protocols. This enables the surveillance system 10 to identify candidate response units that are in close proximity to a detected incident.

Figure 2:
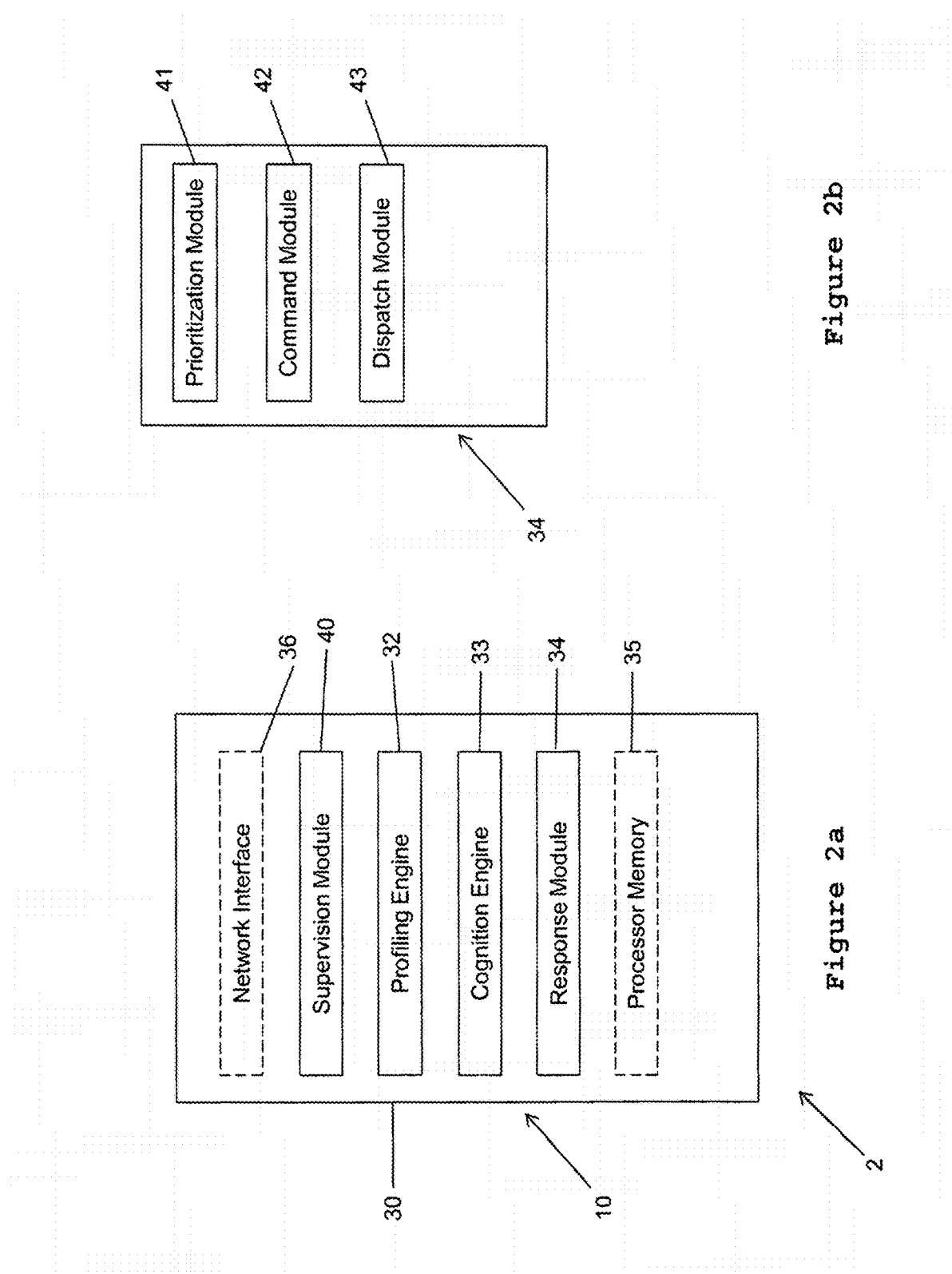
FIG. 2a is a block diagram of an automated surveillance system depicting a various operational modules.
FIG. 2b is a block diagram of a response module depicting a various operational modules.

The surveillance system 10 can also be employed by commercial operators using generic GPS enable devices (such as smart phones) to track mobile response units and distribute response instructions. Possible commercial applications include site security, counter staff allocation within large department stores and maintenance staff for industrial facilities. A block diagram representation of an automated surveillance system 10 is depicted in FIG. 2a. The system 10 comprises a server 30 that receives a plurality of surveillance feeds from an associated surveillance network. The surveillance system 10 may receive surveillance feeds from a plurality of surveillance networks.

Each of the surveillance feeds received by the server 30 is tagged with a geospatial reference. The geospatial reference tag identifies the origin of the surveillance feed (ie. the surveillance location). The surveillance feeds may also be tagged with a time stamp that indicates when a corresponding component of the feed was captured (such as the time a video frame or sound bite was recorded). The time stamp can be derived from the system clock of a corresponding surveillance node 11 (the time the feed component was recorded) or a centralized clock associated with the surveillance server 30 (the time the feed component was received by the surveillance system 10). The system clocks of the surveillance nodes 11 connected to the network 1 can be periodically synchronized with a centralized system clock to reduce time discrepancies among nodes.

The geospatial reference tags for individual surveillance feeds can be derived from spatial reference codes associated with the source surveillance node (ie. the surveillance node responsible for the feed). The spatial reference code may dynamic (such as GPS co-ordinates generated by the surveillance node) or static (such as a surveillance location programmed into the node during installation).

The surveillance server 30 is capable of deriving geospatial reference tags for static surveillance feeds where a spatial reference code is not available. The surveillance nodes 11 are typically registered with the surveillance server 30 following integration in the surveillance network 1. The node registration stored by the server 30 usually includes an installation record that can be matched to the surveillance feed generated by static nodes. This enables the server 30 to link the surveillance feed to a generalized installation location documented in the installation record.

The surveillance feeds are received by a network interface 36 that is integrated with the surveillance server 30 in the illustrated embodiment. The communications interface 36 co-ordinates communication between the surveillance server 30 and the surveillance nodes 11. The surveillance server 30 is ideally a designated network controller and may be responsible for maintains global networks parameters (such as node system clocks). The communications interface 36 is capable of transmitting network updates from the surveillance server 30 to the surveillance nodes 11.

The surveillance system 10 incorporates a profiling engine 32. The illustrated profiling engine 32 is a software module implemented by the surveillance server 30. The surveillance feeds received from the surveillance nodes 11 are analyses by the profiling engine 32. The profiling engine 32 identifies characteristics of the surveillance feeds that are indicative of predefined events (such as vehicular accidents, vandalism, assault and fire). The events detected by the profiling engine may be customized for the surveillance systems intended application (such as detecting obstacles on high-speed rail lines and unauthorized access to secure areas).

The identification routine implemented by the profiling engine 32 for a surveillance feed reflects the data contained in the corresponding feed. The profiling engine 32 may implement more than one identification routine for some surveillance feeds. Typical identification routines include facial recognition, chemical trace identification, audio classification, number plate identification and non-motion detection.

Audio surveillance feeds are often subjected to spectral decomposition and classification using an audio reference database. Substance feeds are ideally analyzed for contamination before being processed for composition identification. The composition of contaminants may also be determined by the profiling engine 32.

A video analysis and image processing routine that the profiling engine 32 may employ for non-motion detection (such as the detection of unattended baggage) is described later in this specification. An image processing system that facilitates efficient identification and extraction of objects from a video feed is disclosed in PCT/AU2009/000557 (published as WO 2009/135253), which is incorporated herein by reference.

The profiling engine 32 classifies characteristics that are indicative of categorized events in event records. Each of the event records document an event that the surveillance system has detected. The event records comprise an event classification (the type of event detected), a time stamp that records the time of the event and a geospatial reference tag that documents the location of the event. The surveillance system 10 uses the predefined event categories to classify detected events. Each of the event categories typically has a dedicated response index that indicates the severity of an event and recommended response reactions. Typical response reactions include non-intercession for minor events, triggering an incident monitor that checks for event combinations indicative of a predefined incident and dispatching a response unit to attend critical events.

Individual event records may be consolidated into event reports for storage in non-volatile memory. The surveillance server 30 preferably stores the event records in a reporting database following automated evaluation. The reporting database facilitates external audits by compiling historic event records and response reactions determined by the surveillance system 10. The surveillance system 10 may also include a learning module (such as a machine learning engine) that adapts system determinations based on the systems response to historic events and the outcomes of external reviews (such as manual override of response reactions and periodic system audits).

Individual events recorded in the event reports are ideally assigned general classifications by the profiling engine 32. Some typical classifications include growing queues at a service counter (such as the check-in line for an airline), a group of people running in a particular direction, the sound of a gunshot and a vehicle decelerating rapidly.

Detected events that share close spatial and temporal proximity are analyzed by a cognition engine 33 to identify possible causal relationships. The cognition engine 33 documents combinations of events that are indicative of predefined incidents in incident reports. The incident reports are classified by the surveillance system 30 and allocated a response reaction using a similar protocol to the event classification process.

The illustrated cognition engine 33 is a software module implemented by the surveillance server 30. The cognition engine 33 generates incident reports from the event records produced by the profiling engine 32. The incident reports are derived from a plurality of events within close spatial and temporal proximity are indicative of predefined incidents. The events may be detected in several independent surveillance feeds. For example, a 'gunshot event' derived from an audio feed may be combined with a subsequent 'falling event' in a video feed (captured at the same surveillance location) to derive a 'shooting incident'. The cognition engine 33 may characterize event sequences detected in the surveillance feeds using logical protocols (such as Boolean and/or conditional logic algorithms) or statistical analytics (such as statistical classification and/or machine learning).

The temporal proximity of events detected at the surveillance location can be used to generate a correlation factor that quantifies the relationship between the detected events. Spatial correlations can be generated to evaluate relationships for distributed events captured at multiple surveillance locations (such as widespread protests or a riot).

The cognition engine 33 infers relationships between individual events at surveillance locations. Each incident report is derived from a plurality of individual events that are indicative of a predefined incident. Events with an inferred relationship are presumed to originate from a common incident.

The cognition engine 33 evaluates the relationships between events to derive the incident reports. The events may be restricted to an individual surveillance location or distributed across several locations. Typical incident evaluation parameters include spatial and temporal event correlation, statistical similarity of detected events to an incident template (typically defined by predefined incident categories) and subsequent event indicators (such as bystander reactions).

The cognition engine 33 parses event classifications (determined by the profiling engine 32) assigned to events with close temporal and spatial proximity to evaluate possible incidental relationships (events that may originate from a common incident). For example, a 'crowding' event and an 'altercation' event may be indicate of an assault.

The cognition engine 33 ideally maintains an incidental relationship database. The incidental relationship database documents links between individual events that are indicative of an underlying incident. An incident record in the relationship database identifies events that the cognition engine 33 has determined are likely to originate from a central incident.

The cognition engine 33 refines initial relational inferences (derived from event classifications) by evaluating spatial and temporal correlations exhibited by individual events that have incidental relationships. The spatial and temporal characteristics of event sequences may be statistically compared to an incident template to determine the likelihood of interrelation. Events detected at different surveillance locations may be correlated if the time between the events is representative of the spatial separation between the respective surveillance locations.

The cognition engine 33 may generate a correlation index between independent events to facilitate relational evaluations. The correlation index is used to identify events that potentially originate from a common incident. The cognition engine 33 ideally compares the correlation index for a set of events to an established threshold to determine if events are sufficiently correlated to attribute to the same incident. For example, the cognition engine 33 may infer that there is an armed robbery in progress from the detection of gunshots, activation of an audio alarm and a crowd of people rapidly dispersing. The individual event classifications (gunshots, alarm, rapid crowd dispersion) are incidentally related and correlated (spatially and temporally) by the cognition engine before an incident report is generated.

The cognition engine 33 may infer that the robbery is confined to a particular area from the movement pattern of people in the surveillance feed. The surveillance server 30 may access city plans to identify possible epicenters for the incident following generation of an incident report. In this example, the surveillance server 30 may access city plans to determine possible targets (such as a bank located in the vicinity of the surveillance location).

The cognition engine 33 may also infer how incidents will propagate spatially. For example, a large gathering of people at a surveillance location may be inferred as the initial stages of a protest. The inference may depend on characteristics of the crowd extracted from the relevant data feeds by the profiling engine 32 (such as a high density of placards, chanting and facial recognition of established protest leaders). The cognition engine 33 may infer a destination and route for the protest from the starting location and the general movement of the crowd. This allows the surveillance system 10 to track progress of the protest and issue advance warning for possible interruptions (such as traffic delays).

The automated surveillance system 10 may monitor the progress of the protest through adjacent surveillance locations (disposed along the determined route) and update the destination and route inference as necessary. The surveillance system 10 ideally includes a distributed surveillance module (not shown in the drawings) that monitors incidents (or events) that propagate across multiple surveillance locations. The distributed surveillance module ideally generates appropriate alerts (such as a traffic congestion warning for streets likely to be blocked by the protest) and may dispatch a response unit if there is unrest.

An automated response module 34 determines a response reaction to events and incidents identified by the surveillance system 10. The automated response module 34 can forward response reactions to operational control for verification or co-ordinate respondents without operator intervention. The illustrated response module 34 is a software module that is implemented by the surveillance server 30.

The response module determines a response reaction to each incident report generated by the cognition module 33. Each response is typically derived from a response index assigned to a corresponding incident category. For instance, the response module 34 may determine that no intercession is required because the incident is minor (such as a pedestrian slipping at an intersection). Some response options may require the surveillance server 30 to receive a confirmation input before it initiates the dispatch of a response unit (such as a heavily armed response unit). The response module 34 may also determine a response to an individual event identified by the profiling engine 32.

The response module 34 identifies potential response units that are capable of responding to an event or incident. Typical response units include additional counter staff for an understaffed airport check-in counter or retail store, a janitor for accidents involving non-hazardous waste (such as spilled food at a food court), a school teacher or security guard for a schoolyard altercation and an emergency service team for more serious disturbances.

The surveillance server 30 illustrated in FIG. 2a hosts the entire automated surveillance system 10. The profiling engine 32, cognition engine 33 and response module 34 are integrated in a centralized surveillance server 30 in the illustrated embodiment. This is a functional representation of the surveillance system. The particular organization of modules, sub-modules and functions performed by the surveillance system ultimately does not change the system functionality. The physical and functional organization of system components may be altered from the embodiment depicted in the drawings.

The schematic system representations presented in the Figures depict a functional representation of the surveillance system. They do not necessarily represent the actual structure or implementation that would be encountered in a practical installation. The surveillance system components may be implemented by various software and hardware arrangements without altering the fundamental functionality of the system. For instance, the entire surveillance system 2 may be integrated in a single centralized server (as illustrated in FIG. 2a) or distributed over several interconnected computing systems.

The functional components of the reference system 2 may be implemented in any suitable computing architecture, such as a cloud based system, a virtual machine operating on shared hardware, a dedicated hardware machine or a server bank of connected hardware and/or virtual machines. The term 'server' in this specification represents general computing system functionality and is not limited to a particular type of hardware architecture.

A block representation of a response module 34 is depicted in FIG. 2b. The illustrated response module 34 has a prioritization module 41 that assesses event records and incident reports that have been generated by the surveillance system 10. The prioritization module 41 assigns detected events and incidents a response prioritization rating. The response prioritization rating reflects the severity of a corresponding incident and precedence of any remedial response. The prioritization rating can be determined from a lookup table that documents event and incident response precedents.

The response module 34 may apply a standardized prioritization rating scheme to evaluate events and incidents with similar characteristics (determined by the profiling module 32). The prioritization rating assigned by the prioritization module 34 defines a response priority for each event and incident.

A command module 42 is integrated into the response module 34 illustrated in FIG. 2b. The command module 42 monitors the geospatial position of a plurality of designated response units. The response units are generally registered with the surveillance system 10 and transmit spatial co-ordinates (such as GPS co-ordinates) to the command module 42. The command module 42 uses the prioritization rating, classification and geospatial reference tag for an event or incident to identify possible response units. The command module 42 nominates response units for an incident based on proximity to the surveillance location and suitability for responding to the event/incident. The prioritization rating of an incident may alter the geospatial region that the command module 42 evaluates for response units.

The command module 42 can interrogate auxiliary references to identify candidate response units. Typical auxiliary references include area maps of the surveillance location, recent traffic reports and expected pedestrian density. The command module 42 can incorporate information from the auxiliary references in the evaluation of response units for an incident.

The command module 42 ideally predicts a response time for a plurality of response units. The predicted response time for each unit is compared to evaluate the proximity of the units to a surveillance location. The response time determination for each unit typically incorporates several parameters, such as the physical proximity of the unit to the incident (either the surveillance location where the incident was detected or a predicted incident location derived from incident characteristics), the predicted route from the current unit position to the incident (particularly for vehicular response units in dense cities) and expected delays on the predicted route.

The illustrated response module 34 also includes a dispatch module 43. The dispatch module 43 monitors the availability of response units and co-ordinates the dispatch of response instructions. The dispatch module 34 evaluates the availability of nominated response units and dispatches response instructions for an incident to available response units in close proximity to the corresponding surveillance location. The response instructions may be transmitted to individual response units via proprietary infrastructure (such as municipal emergency service communication systems) or third party networks (such as cellular or wireless networks).

The dispatch module 43 evaluates the priority of new incidents by comparing the prioritization ratings of 'live' incidents in a region (i.e. incidents that are identified as unresolved and listed in a response queue). The priority of new incidents may be used to evaluate the availability of response units. For example, the dispatch module 43 may redirect a response unit attending a low priority incident to a new incident with a higher prioritization rating.

Figure 3:
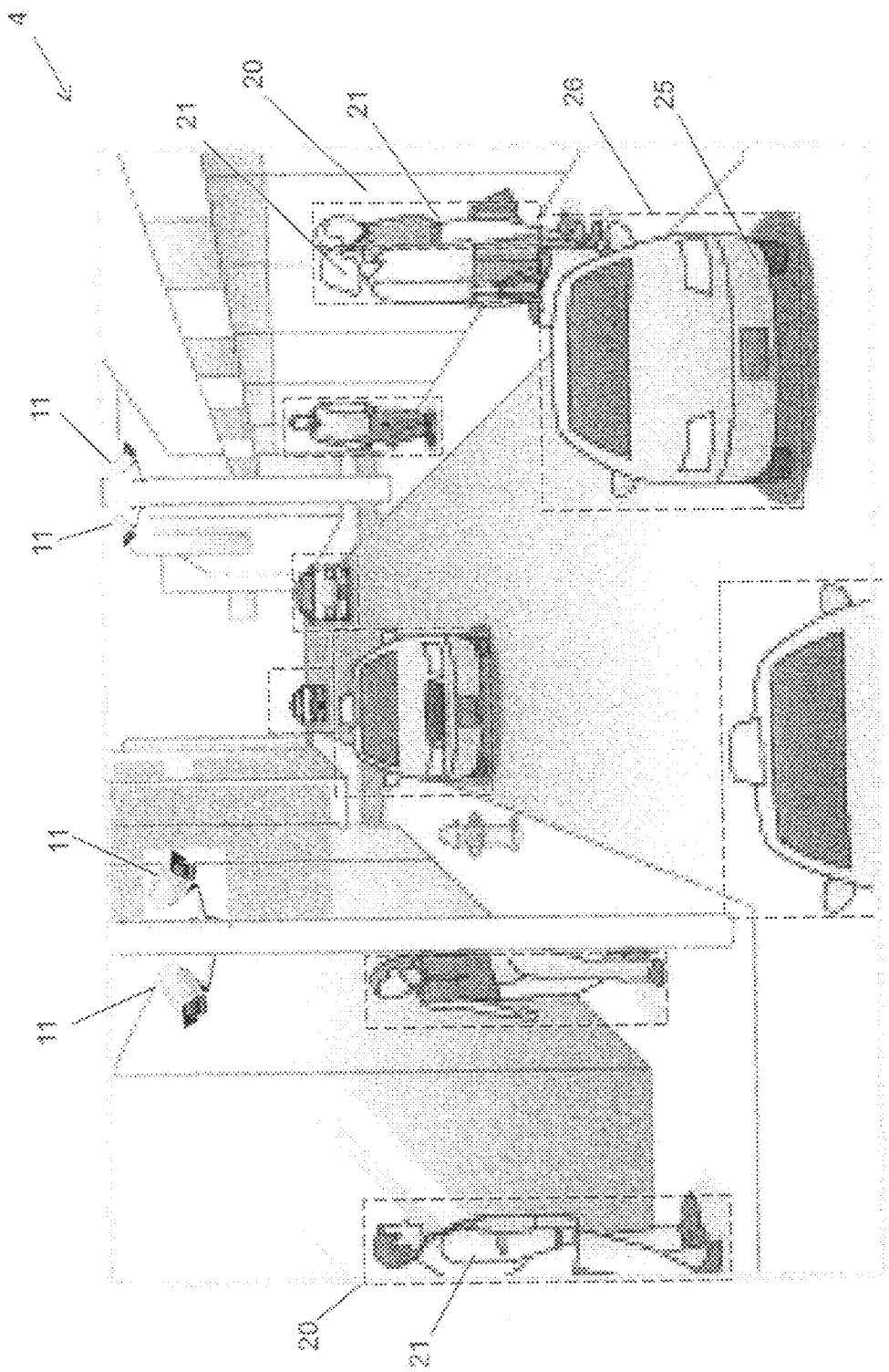
FIG. 3 is a schematic representation of a city streetscape with a plurality of surveillance nodes (video cameras) disposed at various locations.

An exemplary city streetscape in which surveillance network 1 has been deployed is depicted in FIG. 3. The streetscape 3 includes four surveillance nodes 11. The surveillance nodes 11 are integrated in a surveillance network. The illustrated nodes 11 are CCTV cameras. The cameras 11 are mounted in elevated positions above street level. The position and elevation of the cameras may be customized to reflect specific surveillance objectives and street characteristics.

Typically, the mounting position and orientation of cameras (both motion and still image cameras) is selected to optimize the view field for the respective nodes 11. This reduces the total number of cameras that are needed to cover a particular space. Other types of surveillance nodes (such as microphones or chemical trace detectors) may have different mounting configurations that reflect the environment they are mounted in and the properties they are measuring.

The surveillance network 1 may operate in a diverse range of applications. Some examples are open public spaces (including streets and parks), public and private buildings, essential infrastructure (such as bridges), airports, factories and military bases. Typically, each surveillance network is operated by a particular organization associated with the installation (city councils, building landlords, businesses etc).

Some entities may operate more than one surveillance network in a particular space (such as an airport). The individual surveillance networks operating at a facility may be installed and monitored by different organizational groups (such as separate security, operations and marketing surveillance installations) or grouped in spatial clusters (such as different terminals at an airport). Each network is typically monitored by different operating personnel.

The surveillance networks may therefore not be commonly owned or even connected to each other. The system of the present embodiment, however, is able to take data feeds from a plurality of the surveillance networks, and preferably all of them, so as to provide, in a preferred embodiment, city-wide or country wide coverage. The system of the present invention can, in one embodiment, take advantage of a plurality or all surveillance networks in a particular area, town, city or country to provide wide network coverage.

The environment depicted in FIG. 3 represents a typical city streetscape. The street is populated with pedestrian 21 and vehicular 26 traffic. The automated surveillance system 10 processes the surveillance feeds generated by the nodes 11 and identifies salient characteristics of the streetscape to monitor.

The system 10 may generate temporal characteristic profiles to evaluate salient characteristics. The temporal characteristic profiles identify dynamic attributes of the surveillance feeds. The automated surveillance system 10 ideally monitors changes (or the absence of changes in some circumstances) in the profiles to evaluate the saliency of the corresponding characteristics.

The automated surveillance system 10 typically samples the surveillance feeds at regular intervals to generate the temporal characteristic profiles. This function is performed by a supervision module 40 in the embodiment illustrated in FIG. 2a.

One form of temporal characterization involves generating geometric profiles for dynamic attributes of a video surveillance feed. The supervision module 40 may produce similar dynamic profiles for other (non-video) surveillance feeds (such dynamic chemical composition profiles that monitor for gas leaks).

A geometric profiling process for a video surveillance feed is depicted schematically in FIG. 3. The supervision module 40 generates geometric profiles for objects within the surveillance feed. This is the initial profiling phase for an object. The evolution of the geometric profiles is temporally tracked by monitoring variations in the size and orientation of the profiles in subsequent samples from the surveillance feed (video frames in the video surveillance example illustrated in FIG. 3). Geometric profiles 20, 25 for pedestrian 21 and vehicle 26 are depicted in FIG. 3.

The size of an object's geometric profile in a video surveillance feed changes as the distance between surveillance node 11 and the object is altered. The rate that the profile changes size may be used to gauge how quickly an object is moving. This is particularly applicable for objects trailing along a defined path (such as vehicles travelling along a street).

Changes in the orientation of an object may also be used to derive events from the video surveillance feed. For instance, a 'pedestrian' profile 20 that changes from an upright orientation to a 'horizontal' orientation may indicate that a person has slipped or collapsed. The surveillance system 10 ideally monitors the orientation of the altered profile in subsequent samples before making a response determination.

The surveillance system 10 may adapt to persistent characteristics of individual surveillance feeds. For example, the orientation of a camera with respect to traffic passing along a street may influence the rate at which traffic objects change. Similarly, the location of a chemical detection unit may influence the composition of samples extracted from the surveillance location (ie. proximity to industrial facilities). The profiling engine may collate and process historic profile records to develop surveillance characteristics for a particular surveillance location. Ideally a statistical learning algorithm (such as a form of neural network) is applied to the historic records. This approach enables the surveillance system 10 to efficiently identify atypical profiles changes. Unexpected changes to the profiles are likely to represent salient events.

The surveillance system 10 may receive external information from sources outside the associated surveillance networks. External information feeds can include weather forecasts, schedules for significant road works, major event plans (such as sporting events), organized demonstrations and other planned or predicted interruptions. The surveillance system 10 may develop correlations between external information feeds (such as extreme weather forecasts) and the impact the event has on various surveillance locations.

The profiling engine 32 extracts characteristics from each surveillance feeds captured by the surveillance network that are indicative of predefined events. The profiling engine 32 may be functionally divided into dedicated modules that process particular feeds categories (such as video, audio, chemical composition etc). The individual profiling engine modules may implement a plurality of processing routines that target defined attributes of a surveillance feed. A processing routine for non-motion detection in a video surveillance feed is outlined in this specification. The video profiling module is likely to implement several other routines to adequately process a video feed (such as object characterization, facial recognition, number plate identification, collision detection, crowding etc).

Summary of Non-Motion Detection

Consider an image sequence as a collection of time series. In the simplest case, each time series simply records changes in the 8-bit greylevel of a pixel. More generally, a simple operator can be applied to neighbourhoods across the image to produce a series of processed images. The time series are then the output of this operator on each neighbourhood. Any changes in the background can be thought of as identifying a function of this distribution that corresponds to the background. This distribution can be monitored to determine if the feature changes. Statistical techniques can be used to determine whether the background is reliably identified, or whether a change is significant.

As a simple illustration, consider the problem of estimating the background scene in an image sequence containing only small amounts of motion or movement. Typically, a camera is stationary, and the environment is constant. Lighting levels are unchanging. The distribution of grey levels at a single pixel over time can be thought of as being a mixture of two distributions: (i) one distribution reflecting the essentially static background, and (ii) the other distribution reflecting transient objects, such as passing people.

If the distribution of greylevels of transients is roughly uniform while the background is essentially unchanging, so that its distribution is nearly a delta impulse function. That is, transients do not vary significantly from frame to frame. The background is thus the most frequently appearing value in each of the time series. In other words, the background is be the mode of the distribution. Thus, a change in the background is indicated by a change in this mode.

Therefore, by analysing the distribution of incoming features over time, one can first identify the background from the distribution of feature values and then detect changes to this background through changes in the distribution.

The problem is helpfully recast in language that allows access to a range of existing statistical techniques. In particular, suppose that a point p in the scene and instant t in time the detection system observes a feature Op,t. This feature varies as people or objects move through the scene past a stationary background, and also of the background changes. This behaviour is modelled as a random process, with Opt, being assumed to be distributed defined by Equation [1] below.

$$O_{p,t} = \begin{cases} b_F + \epsilon_t : \text{with } prob\ q_p \\ f_{p,t} + \epsilon_t : \text{with } prob\ 1 - q_p \end{cases} \quad [1]$$

In Equation [1] above, bp represents the background feature at p,fp,t represents some non-background feature (such as a transient object), which can in turn be modelled as another random variable with distribution function Dp(f). The term t represents noise.

The two problems of background estimation and non-motion detection can now be formally stated as problems in estimation theory and hypothesis testing as follows:

Infer bp from a sequence of TE observations Op,t

Given bp and a sequence of TD observations Op,t test the hypothesis that bp has changed.

The model above assumes that feature observation at each point p and time t are independent. This model can be easily extended, however, to incorporate correlation in space and time. Similarly, more than one feature might be used.

Although the model may seem overly formal for the practical problem of non-motion detection in a wide variety of scenes, the probability is unlikely to be known beforehand, and indeed will probably vary with time. Further, formalising the problem clarifies the issues in constructing non-motion detectors. Formalisation also links the problem to the large body of existing theory and results on statistical estimation procedures.

The Detection System

Figure 4:
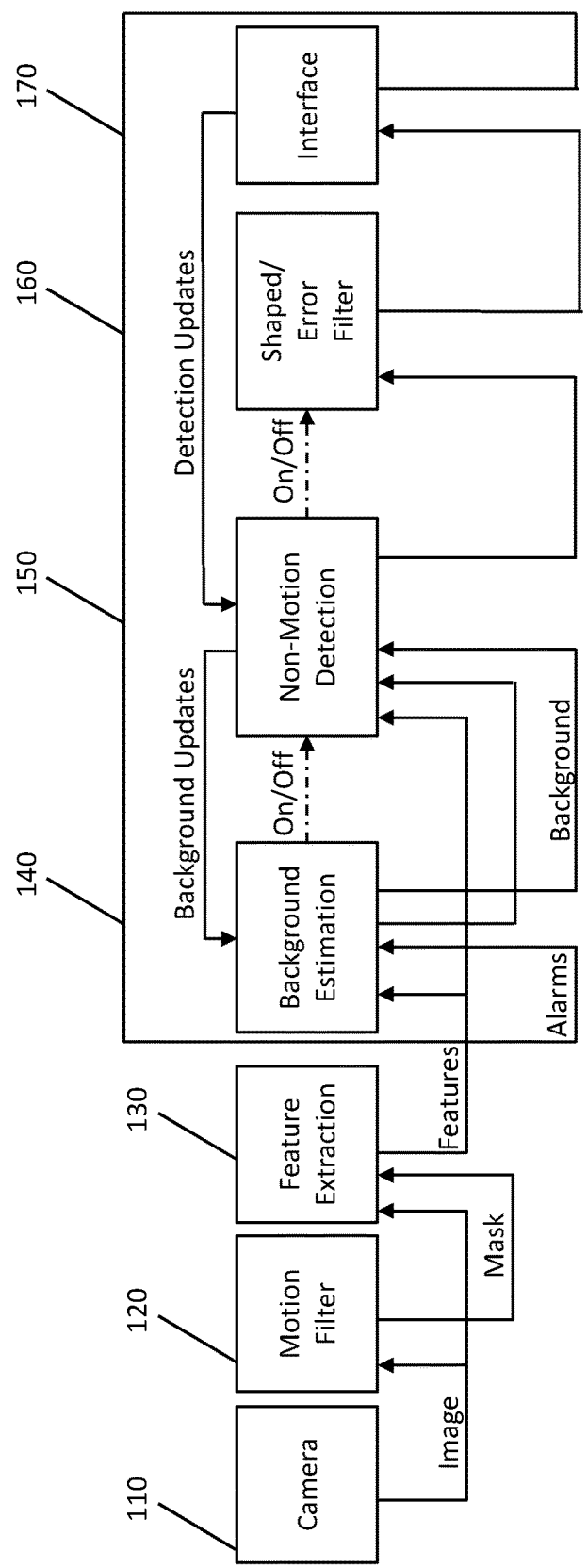
FIG. 4 is a schematic representation of temporal variations in smoke as they are captured by a video node of a surveillance network and profiled by an automated surveillance system.

FIG. 4 represents, in overview, the operation of a motion detection routine that the profiling engine 32 may implement to analyze video surveillance feeds. In broad terms, the input image captured by a camera 110 first passes through an enhancement stage (not shown in FIG. 4). A motion filtering operation 120 and feature extraction operations 130 are then applied. The order in which these operations 120, 130 are performed is not important.

A feature array is extracted from the image and passed to a background estimator 140. This process continues repeatedly until a reliable background estimate is obtained, at which point the detection module 150 becomes active. The detection module 150 outputs any changes to an array of alarm states that circulate around the background estimator 140 and remaining modules 150, 160, 170.

Given a set of alarm states the shape filter module 160 is intended to pick out detection of the required shape or form (such as a suitcase) and to eliminate obvious misdetections (false alarms). Any detection alarms that do not satisfy criteria specified by the shape filter 160 have their alarm states altered. The alarm states finally pass on to the user interface 170.

Detection Algorithm

Figure 5:
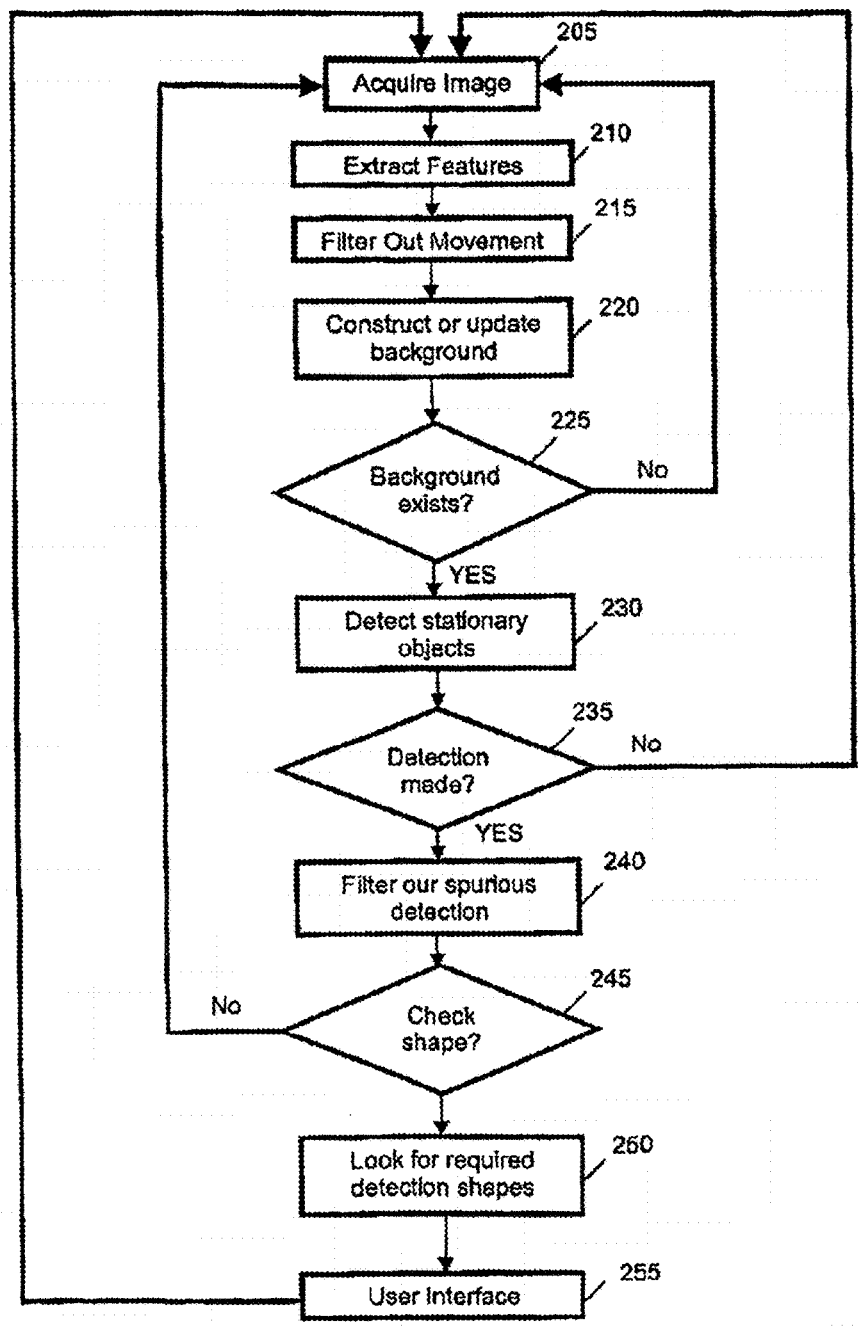
FIG. 5 is a flow diagram illustrating a non-motion detection algorithm which may be utilised with embodiments of the invention.

FIG. 5 flowcharts an overview of an algorithm for non-motion detection. A more detailed description of technical considerations and particular algorithmic steps is provided below. Table 1 presents a pseudocode implementation that corresponds with the flowchart of FIG. 5. Corresponding steps are indicated in FIG. 5 and Table 1.

The following contains the basis pseudo-code of the proposed system of detection. The algorithm of the overall detection cycle can be summarised in the pseudocode presented in Table 1.

TABLE 1

| WHILE not quit | |
|---|---|
| Acquire Image | (step 205) |
| Extract Features | (step 210) |
| Filter Out Movement | (step 215) |
| Construct or update background estimate based on features. | (step 220) |
| IF background estimate exists | (step 225) |
| Detect stationary objects | (step 230) |
| IF detection made THEN | (step 235) |
| Filter out spurious detection | (step 240) |
| IF check shape THEN | (step 245) |
| Look for required detection shapes | (step 250) |
| User Interface | (step 260) |

In FIG. 5 and Table 1, an image is acquired in step 205. Features are extracted in step 210, and movement is filtered from the image in step 215. A background image is constructed or updated in step 220. If a suitable background image is found to exist in step 225, stationary objects are detected in step 230. If a suitable background image does not exist in step 225, processing returns to step 205, so that further images can be acquired and features extracted and movement filtered out.

If a detection is made in step 235, spurious detections are filtered out. If a check is to be made of an object shape in step 245, the shape of the detection is matched against predetermined shape criteria in step 250. If predetermined criteria are satisfied, the user interface is appropriately alerted or updated. Particular steps outlined of the process are described algorithmically in greater detail below.

In overview, for each incoming frame, the image is divided into N by M subregions. A value is extracted from each subregion representing some feature that is measured (for example, a texture). For each subregion of the image, the measured values are used to construct a representation of the probability density function (pdf) of the measured values by constructing, for example, a histogram or other convenient representation.

If required, previous frames can be compared to eliminate feature values associated with any obvious movement. The background is estimated as the most frequent feature value in each pdf, which is re-estimated at regular intervals. This estimate, and its updates, are desirably constructed from a long sequence of images.

Once a background estimate is available, for each subregion, a second pdf is constructed whenever the incoming feature value does not correspond to the estimated background.

This second pdf is reset if the background reappears (that is, becomes significant in the second pdf). After sufficient time is allowed to construct the second pdf, examine the peaks of the pdf and compare these peaks with the background. If a significant shift/change occurs, register the region as a potential change. If the potential change is still present at the critical detection time, then mark region as changed. If the background is still not visible at some time after the critical detection time, yet no significant peak is present in the pdf, register the region as either an alarm or as otherwise requiring human decision.

If a change is detected, check to determine whether this change is isolated or part of a cluster of changes. If desired, compare cluster's size and shape to that which you are trying to detect (for example, a "suitcase-sized" shape). Register an alarm if the region satisfies this constraint.

Image Enhancement

The image enhancement module, which for convenience is not represented in FIG. 4, operates on input images prior to extracting particular features and generally improves detection of features such as edges. Furthermore, in real practical terms one finds that image enhancement is desirable due to the quality of the original input image from the camera 110. To improve the images, any one or more of a variety of image enhancement techniques may be used, such as histogram equalisation.

Image enhancement can noticeably improve feature discrimination and detection. Since histogram equalisation is sensitive to scene changes, the process should only be applied periodically to typical images, and look-up tables determined by these equalisations then be applied to intervening input images. Such a regime ensures that feature vectors for the same object in successive scenes do not fluctuate due to changes elsewhere in the image.

One should also be careful that over-equalisation does not occur, since this may have an undesirable effect on the extraction of some of the features. Smoothing the histogram prior to equalisation may not always reduce this effect. An alternative is to base equalisation upon the square root of the histogram.

Motion Filtering

Both background and non-moving objects are by definition stationary. Accordingly, only stationary features are used in background estimation and non-motion detection. A filter can then be used to mask out features Op,t that have recently changed, improving both the background estimation and target detection in busy scenes. A simple motion filter can then be implemented, whereupon current and previous frames are compared. Regions of significant change are marked as regions that are likely to contain motion, and such regions are excluded from further consideration.

This form of motion filtering can be implemented both as a pre-feature and post-feature process. When applied as a pre-feature process, a greyscale differencing procedure can be applied to each pixel. Thus, for example, if more than 60% of the feature region contains changes, the region is marked as containing movement. For post-feature processing, the current feature is simply compared to the previous feature.

Feature Extraction

Feature extraction can be used to track changes in each individual pixel of the original image. In practical terms, though, this is not possible due to the excessive computation loads placed on the detection system. Accordingly, one may choose to track features Op,t at a subset of pixel's p. This not only reduces the computational load, but also has the added advantage that the features can now be computed as functions of all the pixel's in a window about p. The resulting features can thus be constructed to be more robust with respect to noise or other extraneous influences, and also be tuned to optimise the performance of the estimation and detection procedures.

Feature Definition

Before defining the various features the following notation is introduced. I denotes the L×W matrix of pixel intensities that constitute the image, so that Ii,j denotes the intensity of the (i,j)-th pixel. Ni,j denotes a neighborhood centered on the (i,j)-th pixel, in accordance with Equation [2] below.

$$N_{i,j} = \{(p,q): |p-i|, |q-j| \leq K\} \quad [2]$$

In Equation [2] above, K defines the size of the neighborhood. Typically the image will be tiled by a collection $\{N_{iK,jK}: 1 \leq i \leq L/K-1, 1 \leq W/K-1\}$ of overlapping neighborhoods. On each of these neighborhoods a single feature or a feature vector is calculated. This calculation summarises the behavior of the image in the neighborhood, and reduces the amount of data that needs to be considered at later stages. Overlap of neighborhoods ensures that significant objects within the image that are not aligned with the feature sampling grid are still captured.

Next, Ni,j denotes the set of pixel values in the neighborhood Ni,j. That is, $N_{i,j} \equiv \{I_{p,q}: (p,q) \in N_{i,j}\}$. Smoothing and edge filters are now defined as follows. Given coefficients k and c and the function $$g(x, y) = ke^{-(x^2+y^2)/c}$$

the smoothing kernel Gi,j on a neighborhood Ni,j is defined by Equation [3] below.

$$G_{i,j} = \{g(i-p, j-q): (p,q) \in N_{i,j}\}. \quad [3]$$

The associated edge filters Gx and Gy and the zero crossing filter GΔ are defined in Equations [4] to [6] below.

$$[G_x]_{i,j} = \left\{ \frac{\partial g(i-p, j-q)}{\partial x} : (p,q) \in N_{i,j} \right\} \quad [4]$$

$$[G_y]_{i,j} = \left\{ \frac{\partial g(i-p, j-q)}{\partial y} : (p,q) \in N_{i,j} \right\} \quad [5]$$

$$[G_\Delta]_{i,j} = \left\{ \frac{\partial^2 g}{\partial^2 x} + \frac{\partial^2 g}{\partial^2 y} (i-p, j-q) : (p,q) \in N_{i,j} \right\} \quad [6]$$

For simplicity, the subscripts (i,j) are omitted unless necessary, so that N and N denote a generic neighborhood N}, I and the collection Ni,j of pixel values on this neighborhood.

In the example system, the coefficients k and c are typically in the order of 8.0 and 0.3K 2 respectively. These values are chosen to ensure both satisfactory coverage of the neighborhood N, and reasonable approximation when reducing the operator to an array of discrete values.

The basic operations on neighborhoods used to define features are as follows. First denotes the mean intensity value of the neighborhood N, defined by Equation [7] below.

$$\overline{N} \equiv \frac{1}{(2K+1)^2} \sum_{(p,q) \in N} I_{pq} \quad [7]$$

A⊕B denotes the sum of products over a neighborhood N, as defined by Equation [8] below.

$$A \otimes B \equiv \sum_{(p,q) \in N} A_{pq} \cdot B_{pq}, \quad [8]$$

A⊖B denotes the sum of differences, as defined by Equation [9] below.

$$A \ominus B \equiv \sum_{p,q \in N} A_{pq} - B_{pq} \quad [9]$$

A number of feature operators can be used, as outlined below.

Averaging: This operator is simple to calculate, well distributed and $O_{p,t} = \overline{N}$ relatively invariant to noise. A minor variation is to weight the average by a Gaussian, as defined in Equation [10] below.

$$O_{p,t} = \frac{N \otimes G}{\overline{G}}, \quad [10]$$

In Equation [10] above, $\overline{G} = \Sigma_{p,q \in N} G_{pq}$.

Gradient: Gradient can be calculated using Equation [11] below.

$$O_{p,t} = (N \otimes G_x)^2 + (N \otimes G_y)^2 \quad [11]$$

Second Moment: Second moment feature extraction is calculated using Equation [12] below.

$$O_{p,t} = N \otimes G_\Delta \quad [12]$$

Combination: This feature is a weighted combination of mean brightness and image variance, as defined by Equation [13] below.

$$O_{p,t} = \frac{1}{2}(\overline{N} + \text{var}(N)) \quad [13]$$

In Equation [13] above, var(N) is the variance of pixel values over the neighborhood N.

A more systematic approach to constructing features Op,t is to require that the features are relatively invariant to certain changes, of which the most important in practice is invariance to changes in overall light levels. Examples of features that are invariant to linear rescalings of intensity values are outlined below.

Edge Angle $$O_{p,t} = \arctan(N \otimes G_x, N \otimes G_y) \quad [14]$$

Pattern $$O_{p,t} = \frac{\sum_{p,q \in N} |N_{pq} - \overline{N}|}{\overline{N}} \quad [15]$$

Invariant Gradient $$O_{p,t} = \frac{N \otimes G_x^+ - N \otimes G_x^-}{N \otimes G_x^+ + N \otimes G_x^-} - \frac{N \otimes G_y^+ - N \otimes G_y^-}{N \otimes G_y^+ + N \otimes G_y^-}, \quad [16]$$

In Equation [16] above, $G_x^*$ and $G_y^*$ correspond to filters composed of the positive values of the Gaussian's first derivatives Gx and Gy. Similarly $G_x^-$ and $G_y^-$ correspond to filters composed of the negative values.

Invariant Second Moment $$O_{p,t} = \frac{N \otimes G_*}{N \otimes |G^*| + k}, \quad [17]$$

Equation [17] above, G*, instead of the Laplacian of the Gaussian, is defined by Equation [18] below.

$$[G_*]_{i,j} = \left\{ \int_{-a}^{+a} \int_{-\sqrt{a^2-\alpha^2}}^{+\sqrt{a^2-\alpha^2}} \left( \frac{\partial^2 g}{\partial^2 x} + \frac{\partial^2 g}{\partial^2 y} \right) \right. \quad [18]$$

$$\left. (i-p+\alpha, j-q+\beta) d\beta d\alpha : (p,q) \in N_{i,j} \right\}$$

In Equation [18] above, a≈K/2. This more complex operator is intended to be similar in behaviour to the Laplacian, but less sensitive to factors such as camera jitter, which can severely affect the output near zero crossings.

Invariant Greyscale: Let G* be a smoothing kernel and N* represent the pixel values over the neighborhood N* in Equation [19] below.

$$N_{i,j}^* = \{(p,q): |p-i|, |q-j| \le K^*\} \quad [19]$$

In Equation [19] above, K*>>K. Then, the feature is defined by Equation [20] below.

$$O_{p,t} = \frac{N \otimes G}{\sum_{(p,q) \in N^*} G_{pq}^*, N_{pq}^*} \quad [20]$$

Observe that, in essence, all but one of these operators use total energy to rescale the result of a simpler operator.

Features also have the property of being robust in the presence of noise. In practice the lighting invariant features above are sensitive to noise at low levels, so these features can be regularised by adding appropriate constant δ to the numerators in the expressions above to stabilise them in these situations (for example, the regularised pattern feature is given by Equation [21] below.

$$O_{p,t} = \frac{\sum_{p,q \in N} |N_{pq} - \overline{N}|}{\overline{N} + \delta} \quad [21]$$

The regularisation features are no longer strictly invariant, but as their values at low light levels are unreliable anyway, the trade-off between invariance and robustness is acceptable, if δ can be kept small.

Finally, the histogram-based techniques for background estimation and non-motion detection described below operate most satisfactory if the output of the feature operators is evenly distributed across the range of possible values. This maximises the discriminating power of the histogram-based detection schemes.

Feature Definition Examples

Figure 6:
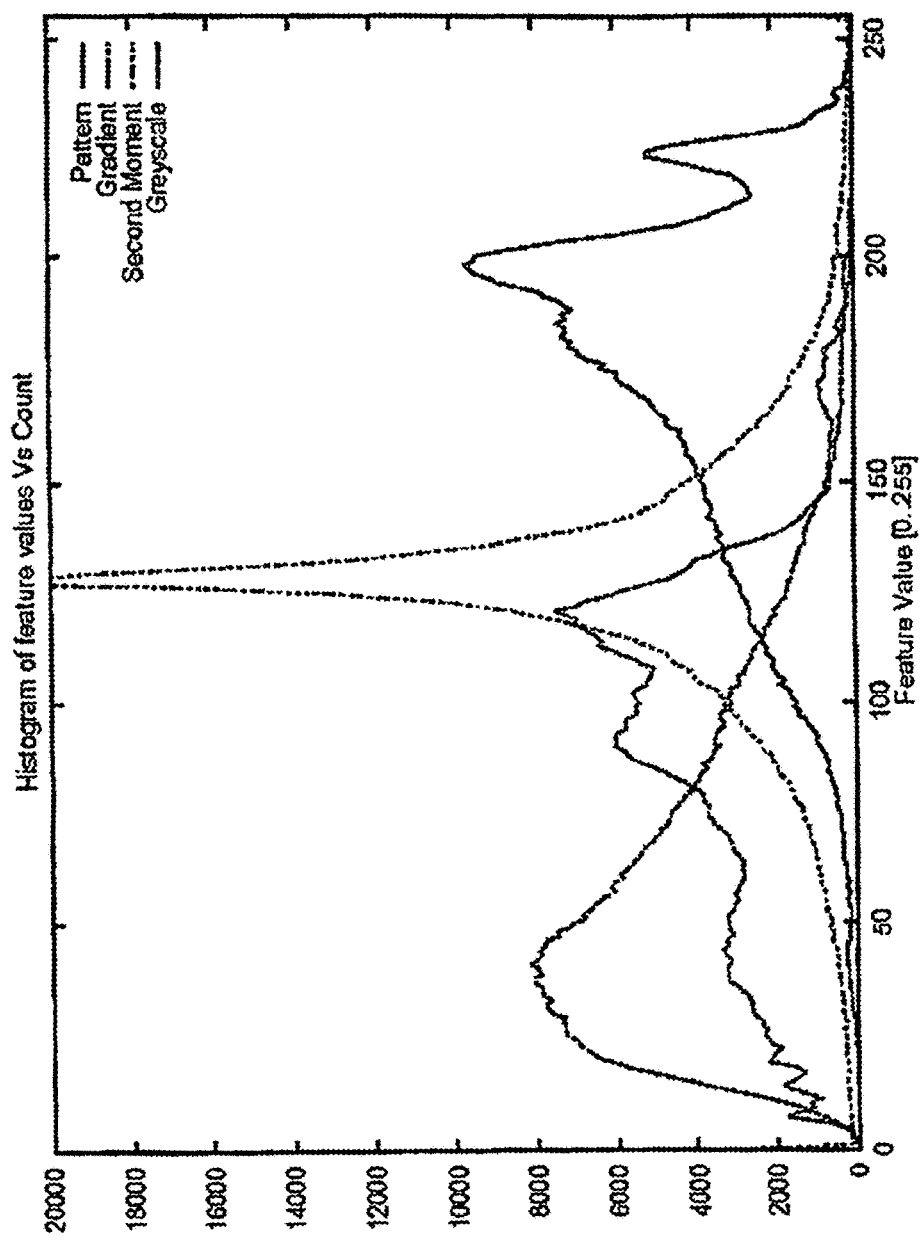
FIG. 6 and FIG. 7 are histograms of feature values based on 100 image frames extracted from a video feed.
Figure 7:
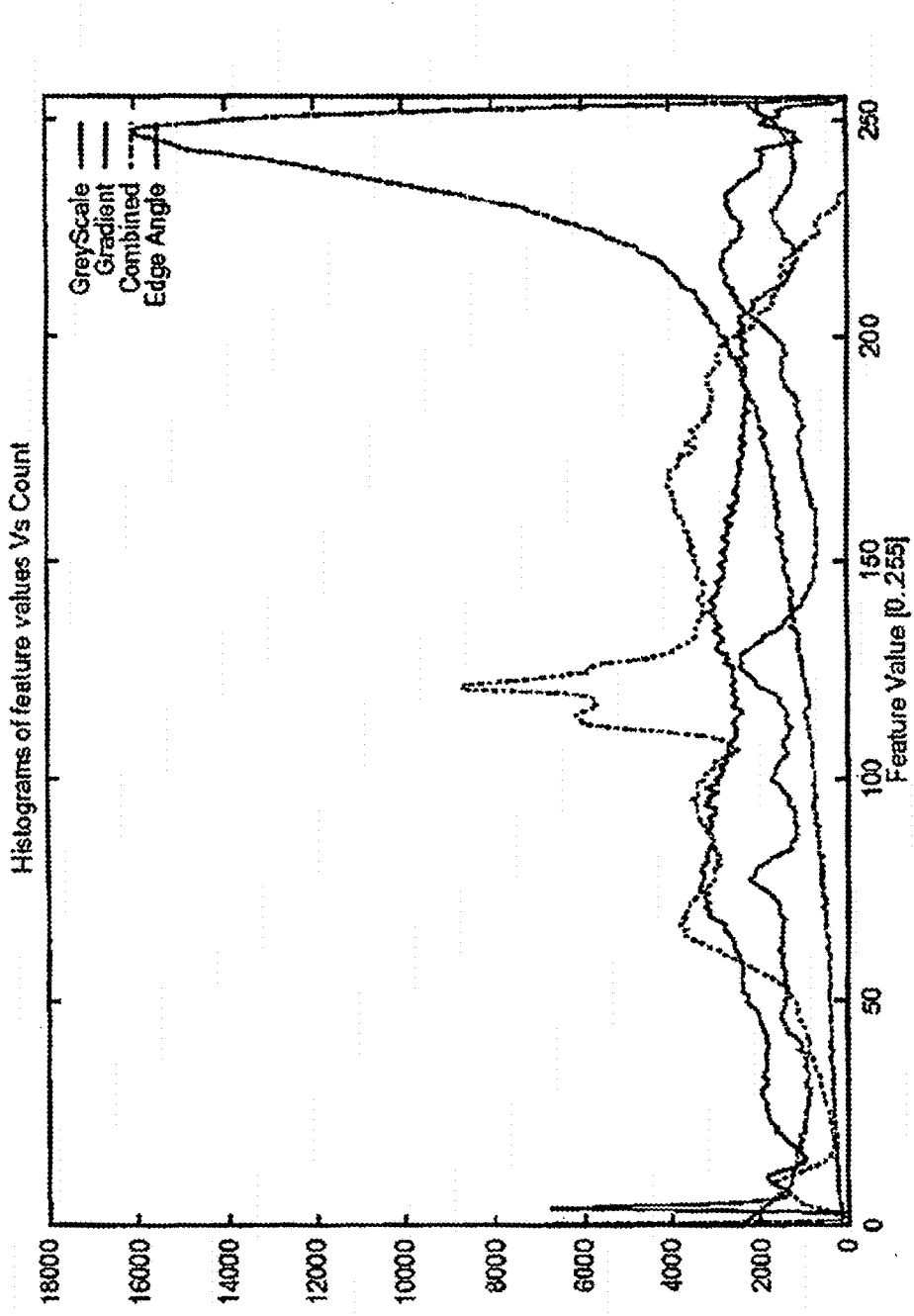

FIGS. 6 and 7 both depict histograms of feature values based on 100 image frames extracted from a video feed. In general, feature values are not uniformly distributed. This can be improved by appropriate rescaling of the output, such as by taking the square root of the pattern feature, although this is not always a complete remedy.

Although a simple approach, simple averaging features, with either uniform or Gaussian weighting, generally provides well-behaved target detections that are relatively non-computationally demanding and generally insensitive to noise. With variable lighting, however, greylevel values between frames may be too unstable to be reliably used in background estimation and detection. Similarly, the combined greylevel and image variance operator tended to have similar properties.

The pattern operator provides good results, and acts in a similar manner to an edge detector. On the other hand, feature distributions for the gradient and second moment methods can be unsatisfactory, while rescaling the outputs to can improve distributions but introduce an unacceptable amount of noise.

The invariant greyscale method provides satisfactory results, and has some of the properties of the simple averaging method. Difficulties can arise in the choice of a larger smoothing kernel, as there is an increase in the computational load. Visually, the operator tends to flatten the original image and produce a "halo" or "ghosting" effect. The output of the edge angle feature operator is uniformly distributed over the interval [0, 2π]. Outputs, however, varied greatly between frames, especially in smooth regions with few edges, making accurate estimation difficult. To take account of this in the detection algorithms described below, a "no feature" bin is included in the histogram. If the edge energy $e = (N^l \otimes Gx)2 + (N^l \otimes Gy)2$ in the neighbourhood falls below a particular threshold E, this bin is incremented.

Whether the improved resolution got by adding a "no feature" bin outweighed the additional overhead, however, was problematic. For example, the concept of an intermediate "possible edge" is necessary to cover the situation when an edge skirted the threshold level. More promising alternatives are either to increment bins in the histogram by the edge energy rather than by a simple unit, or to increment a weighted spread of bins with the weight proportional to the edge energy and the spread proportional to its inverse. This dampens the effects of large fluctuations in the estimated edge angle observed at low-edge energies.

The non-invariant schemes have difficulty coping with a 25% drop in lighting. For the lighting invariant schemes, however, there is no observable difference between frames before and after the lighting drop, and no change in detection behaviour. Furthermore, beside the edge angle operator, the output of the invariant feature operators tended to be exponentially distributed, as represented in FIGS. 4 and 5.

The invariant gradient and invariant second moment operators tended to amplify noise and although regularisation by the addition of a scalar in the numerator reduced the effect of noise, there was a corresponding loss in resolving power.

Only the averaging feature and its associated invariant tended to provide satisfactory detection results across the whole of an object. The output of the remaining features tended to cluster around the object's periphery unless the object contained strong internal features. Moreover, the other invariant and gradient based features can have difficulty distinguishing between one uniform patch of colour and another.

The regularisation term in the invariant feature operators is partly successful and is most satisfactory when noise levels are low. An increase in noise tends to result in large fluctuations in feature values in the darker areas of the mage. This noise sensitivity is mainly due to a rapid transition in output values, which occurs when the total energy in the operator is small. Increasing regularisation to cope with additional noise also reduces the invariant properties of the operators.

Overall, no one operator is superior to another. Generally, the averaging operator is well suited to constant levels of lighting. Since uniform lighting cannot be guaranteed at all times, the invariant pattern, second moment or greyscale operators may be suitable alternatives. One should also bear in mind that the different operators produce different outputs when applied to the same shapes. This observation should be taken into account if shape filtering is used to post-process detections to remove isolated alarms.

Background Estimation

As discussed above, the modelling of the behaviour can be represented with two equations. The first of these is the observed feature is Op,t equal to bp which is the background feature plus some noise.

Naive Estimation

Several approaches to the estimation of the background can be taken. The first of these is the naive estimation or the cumulative method. This method estimates the background by treating the background feature like a time exposure photograph. The background estimate is therefore a conglomerate of many, many frames added together in some fashion. If movement is sparse simple methods may be used to estimate the background. An example is given below in Equation [22].

$$b_{p,t} = \lambda b_{p,j-1} + (1-\lambda) f_{p,j} \quad [22]$$

In Equation [22] above, fp,t is the feature seen at pointy and time t, which may suffice in providing a reasonable estimate of the background. When movement is more frequent simple methods tend to produce motion blurs which can seriously affect the accuracy of the background estimate. If motion detection is available, then such moving features can be filtered out of the background estimation process. Without a reliable method of detecting and filtering, however, such a technique is doomed to fail with a scene containing many moving objects.

The performance of this method may be improved by adjusting the current feature by some small but fixed amount, as the weighted sum approach tends to have rather poor convergence properties. Further, the rate at which new features emerge in the background estimate tends to be more consistent. For example, a white block on a black background appears more rapidly in the background estimate than a dark grey block on the same black background.

Distribution-Based Estimation

An alternative preferred method involves distribution-based estimation. The observed feature can be modelled as a mixture of two distributions, namely the background feature and the transient feature. Although there is no reason to expect that either feature will take on any particular value the only a priori expectation is that the background feature distribution is likely to be strongly peaked about some value. Overall, one may prefer to use features that are likely to have a relative uniform distribution of values when applied to transients, and to take the value of the background feature to be the location of the maximum of the overall distribution of feature values. This is, of course, the mode of the distribution.

This approach involves the following steps. Given a sequence of observations Op,t, build up an estimate of the distribution of their values. After some sufficient number TE of image frames, take the estimate bp* of the unknown background bp to be the feature corresponding to the mode of the estimated distribution.

If the occlusion or interference by passing objects is infrequent, the background is clearly the most frequent feature seen. Thus this method is robust in the sense that the estimator still produces the same value as occlusions increase. This method, however, fails once occlusions are sufficiently frequent that some new value then becomes the mode of the histogram. This point of failure depends on both the occlusion rate and the distribution of the transient feature values. In the case where transient features are uniformly distributed then the estimation still works, even though transients may occur much more often than the background.

One should also be aware that since stationary features are most likely to be background features, performance is most likely enhanced by using movement detection to filter out features that have recently changed. This approach works provided that there is not so much movement in the scene that the background is almost always obscured. If, however, movement is frequent then the movement filter may remove almost all observations and essentially starve the detection system of inputs even though the background may still be intermittently visible.

Histogram Method

A further approach to estimating the underlying distribution is to construct a histogram from a large sample of the incoming feature values. In this case, the estimate of the unknown background is simply the address of the histogram bin with the largest number of counters. This embodiment is computationally simple, and produces reasonable results under the right conditions. However, a histogram is a fairly crude distribution estimator, and needs a large number of samples and bins to build up an accurate approximation to the true distribution.

A more sophisticated distribution estimator is the Kernel method. The kernel function is usually some smooth approximation to a delta function with width controlled by the smoothing parameter. The choice of the smoothing parameter in turn depends on the number of samples that are collected. The kernel method has the general form represented in Equation [23] below.

$$D_p^*(f) = \sum_{t=1}^{T_E} \frac{1}{T_E} K(\lambda^{-1}(f - O_{p,t})) \quad [23]$$

In Equation [23] above, K(f) is termed the kernel function and is usually some smooth approximation to a delta function with width controlled by the smoothing parameter $\lambda$.

The choice of $\lambda$ in turn depends on the number TE of samples Op,t that have been collected. In this case bp* is the mode of Dp* (F).

Direct application of the Kernel approach requires storing a large number of frames prior to background estimation. Alternatively, a kernel may be used to add values into a series of bins, equivalent to those of a simple histogram. The bins can be equated to estimates at discrete points along the true distribution, whereupon the accuracy depends on the number of samples taken, the number of histogram slots and the kernel used.

One parameter approach is to take a small Gaussian kernel, with a variance of at least 1.5 times the width of each bin, that is used in conjunction with a small number of bins. This ensures that the peaks located between sample points are not missed during estimation of the mode whilst preserving the relative simplicity of a basic histogram approach.

Continually updating estimates of the background may be necessary if bp varies over time at a much slower rate than the detection threshold. This may be done by intermittently rescaling the histogram, which has the effect of decaying those peaks in the histogram associated with older features.

Accordingly, the basic approach can be modified as follows. Continue to collect histogram data. Update background estimate intermittently. Once the data exceeds some prescribed threshold, scale down the histogram.

Rescaling is dependent upon the rate at which gradual scene changes are expected. As an external parameter this must be specified. The time scale between updates, however, must be much larger than the specified detection time scales, otherwise gradual overall background changes are confused with detection of motion in particular background features.

An alternative to intermittent rescaling and updating is continuous rescaling and updating. For kernel estimators this is done at every step. An example calculation is given in Equation [24] below.

$$D_{p,t}^*(f) = \rho D p, t-l(f) + (1-\rho) K(\lambda^{-1}(f - O_{p,t})) \quad [24]$$

In Equation [24] above, the "half-life" parameter p reflects the time scale on which the background changes are expected, and the smoothing parameter $\lambda$ now depends on p. The updated estimate b*p, t of bp can also be recalculated at every step.

More generally, various parameters reflect the time scale on which the background changes are expected, and the smoothing parameter now depend on that time scale. The updated estimates can then be recalculated at every step.

Series Estimation

A further alternative to calculating the background estimation is via the series method. The series approximates a Fourier function. This is an alternative to using large set of bins to determine the underlying distribution. The distribution may be approximated by a suitable Fourier series varying within the range of [0, 2π]. A suitable series approximation is given below as Equation [25].

$$D_p(f) \approx \frac{1}{2}\alpha_p(0) + \sum_{k=1,N} \alpha_p(k)\sin kf + \beta_p(k)\cos kf. \quad [25]$$

In Equation [25] above, f varies in some subrange of [0, 2π). One useful property of such a series approximation is represented in Equation [26] below.

$$D_p^{(1)}(f) + D_p^{(2)}(f) =$$
$$\sum_{k=0,N} (\alpha_p^{(1)}(k) + \alpha_p^{(2)}(k))\sin kf + (\beta_p^{(1)}(k) + \beta_p^{(2)}(k))\cos kf \quad [26]$$

Another useful property is the expression presented below as Equation [27], for some constant shift c.

$$D_p(f+c) = \sum_{k=0,N} (\alpha_p(k)\cos kc + \beta_p(i)\sin kc)\sin kf +$$
$$(\beta_p(k)\cos kc - \alpha_p(i)\sin kc)\cos kf \quad [27]$$

Thus an estimate of the distribution based upon the Kernel method can be recomputed each frame by summing the coefficients of the kernel under appropriate translations. This approach can be summarised in Equations [28] and [29] below.

$$\alpha_p^{n+1}(k) = \alpha_p^n(k) + (\alpha^n(k)\cos kf_p^n + \beta^n(k)\sin kf_p^n) \quad [28]$$

$$\beta_p^{n+1}(k) = \beta_p^n(k) + (\beta^n(k)\cos kf_p^n - \alpha^n(k)\sin kf_p^n) \quad [29]$$

In Equations [28] and [29] above, fpn is the n-th feature at point p, and a*(k) and β*(k) are the k-th coefficients of the approximation to the kernel centred upon the origin.

There are many useful properties of such a series approximation. An estimate of the distribution based upon the Kernel method can be recomputed each frame by summing the coefficients of the kernel under appropriate translations.

New estimates of the mode of the distribution can then be computed by sampling the series approximation and noting the maxima. Thus, for a suitable choice of the number of coefficients used, a balance between accuracy and memory requirements can be sought, which can make such an approach a practical alternative.

One of the advantages of this approach is that the background estimate can vary along a full range of values and is not restricted to discrete steps as in the histogram approach. Furthermore, because of the periodicity of such a series approximation, feature values can be made to wrap, or not wraparound, depending on how they are mapped onto the [0,2π] range.

Estimating the appropriate kernel size and shape is a major factor in the case of the series method. One can make the assumption that the feature estimation error will be Gaussian in nature. An automatic estimate is then made based on estimation theory and the amount of noise likely to be present in the image data. Assuming most of the variance is due to feature estimation errors caused by noise, the square root of the estimated variance becomes related to the behaviour of noise present in the data. The optimal size is predicted in accordance with Equation [30] below.

$$h_{opt} = 1.06\sigma n^{-1/s}, \quad [30]$$

In Equation [30] above, σ2 is the estimated variance, and n is the number of samples. Assuming most of the variance is due to feature estimation errors caused by noise σ becomes related to the behaviour of noise present in the data.

Updating can be easily incorporated into this model by rescaling the coefficients in accordance with Equation [31] below.

$$cD_p(f) = \sum_{k=1,N} c\alpha_p(k)\sin kf + c\beta_p(k)\cos kf. \quad [31]$$

Thus, Equations [32] and [33] result.

$$\alpha_p^{n+1}(k) = (1=\lambda)\alpha_p^n(k) + \lambda(\alpha^n(k)\cos kf_p^n + \beta^n(k)\sin kf_p^n) \quad [32]$$

$$\beta_p^{n+1}(k) = (1-\lambda)\beta_p^n(k) + \lambda(\beta^n(k)\cos kf_p^n - \alpha^n(k)\sin kf_p^n) \quad [32]$$

In Equations [32] and [33] above, $\lambda$ is a constant suitably close to 0. Feature values are added to the distribution and slowly decayed away over time as their importance to the current state of the distribution (which may vary temporally) changes.

Detection Induced Updates

A further point that one needs to consider is the maintenance of reliable estimates of the background. In this case it is necessary to consider how detected objects may, or may not, be incorporated into the background estimates. A number of methods of this may be used including but not limited to the following four:

First, simply resetting the detectors in which case an object may repeatedly set off alarms until the object is incorporated into the background, assuming that background updating is active.

Second, one can simply wait until the object disappears, such as a moving person, during which time associated features in background updates are not used.

Third, the background estimate for the detected region may be reconstructed. If histogram detection techniques are used, the collected histogram can be used as initial data.

Fourth, the background estimate may be modified, along with the associated data collection, to match the features of the detection if they are known. If one uses the second and third methods, there is a time during which subregions of the image are blind.

In a fully operational system, it may be desirable to either adopt a default decision with no user control, or to make control as simple as possible. When there is no user control, any detections may be automatically reset after a time interval that is judged to be sufficient for the user to have noticed them. If user input is acceptable, the user may be able to indicate that the detection should be ignored or incorporated into the background.

One of the factors to be considered in background estimation is an appropriate collection time. Generally, the number of frames used to gather the initial estimate may be many times that of the detection time in order to ensure that semi-stationary objects are not unintentionally included in the background estimate.

Performance

Performance of the background estimation schemes is favourable. Given sufficient frames, the histogram method of background estimation appears both reliable and stable. This is largely independent of the feature types used. As might be expected, the series-based approach produces more accurate estimates of the background than the more discrete histogram counterpart. Of course, such accuracy is at the cost of additional computation and memory. By contrast, comparisons with a naive weighted sum (cumulative) method indicate that such a scheme is generally unsuitable, unless good motion filtering is available and few moving targets are present.

Setting an appropriate collection time is certainly a factor in accurate estimation. The number of frames used to gather the initial estimate is desirably many times that of the detection time, to ensure that semi-stationary objects are not unintentionally included in the background estimate. Some problems also remain when there are two (or more) distinct candidates for the background feature. Such a situation may occur if a stationary object is removed part way through background estimation. From empirical observation, though, this problem occurs seldom. Moreover, if multiple peaks become a significant source of errors, estimation can probably be resolved by extending the detection time.

Background updating is also well behaved. Additional updates tend to dampen minor misdetections. Updating and scaling, however, must keep the number of histogram points at a reasonable level, to ensure that neither transients become included nor that actual changes in the background take too long to appear in the background estimate. The four types of detection-induced updating are also examined. As the "reset" approach has no influence on background updating, this approach is the least intrusive. The "wait on reset" approach is also largely unobtrusive: the only concern with its use relates to maintaining a background estimate. If an object remains stationary for a large period of time, the previous background estimate for that region may no longer be valid due to factors such as lighting changes.

The "reconstruct" approach is perhaps more desirable since this approach result in a more reliable estimate of the new background feature. However, there is no guarantee that the object will not move on before the reconstruction is complete, which leaves the background estimate in an uncertain state. Observe that both the "wait on reset" and "reconstruct" methodologies introduce blind spots into the system: in the case of the "wait on reset" this may be excusable if the detected object is expected to move on in a short period of time. Finally, the "modify" approach, whilst allowing immediate updating and continuing detection is potentially vulnerable to mis-estimation of the correct background feature. Insertion of a peak into the histogram (or some similar "trick") is thus not recommended. If a detection histogram is available then this may be used to replace the background histogram. If no rescaling occurs, then aberrations in the initial histogram can be corrected at the next background update.

Non-Motion Detection

Whilst background detection is where the observed feature is equal to the background feature plus some noise, the second problem to consider is whether the observed feature has changed in an image sequence. Four particular techniques are discussed herein. Of these four methods two involve conditional estimation of feature distributions.

Counter Methods

The first method is simply a counter method. Thus if the background is obscured one increments a non-background counter, otherwise one increments a background counter. Both counters are reset when the background counter exceeds a certain threshold. Otherwise, a detection is registered if the non-background counter exceeds some other threshold.

This method quite easily detects image regions that are obscured for some period of time. However, this method fails if any of the features produced by transient objects are the same as those of the background. Further, this method detects a superset of the particular occurrence of interest, since the method responds to motion as well as changes in background.

Thus, this simple method fails in busier scenes, as multiple moving targets are confused with stationary ones. One way to counter the problem, though, is to use motion detection to filter out movement.

Histogram Method

The second method of the histogram method where histogram data is collected at each image region while the background is obscured. If the background reappears the data is reset. Once sufficient points have been collected, one looks for peaks, which exceed some predetermined level. This approach should quickly identify any non-background features and is not readily affected by multiple targets when the background is infrequently obscured.

This method can be further integrated with the background estimation procedure and is less likely to lead to false detections than the counter-based method. This method, however, requires more memory and computational power than simpler methods. Further, the performance of this method degrades when there are a large number of transient features. Detection time generally increases. Finally, this method may fail to detect sufficiently many features from transient objects that coincide with that of the original background.

Histogram with Frame Buffer Method

The third method is an extension of the histogram method and involves a simple timeout. If the histogram size reaches a particular limit without a detection being reported (that is, a large number of frames are examined with no decision reached) the region is reported as a possible detection. This may occur if the background has been obscured for some time, and there may be an object that has been frequently obscured.

A possible variation involves detection time estimation, in which the first and last detection times are associated with each histogram bin. If a feature occurs sufficiently frequently and associated times exceed the prescribed detection time, a detection is registered. The motivation for this approach is that detection times are generally more accurate than histogram size for busier scenes. Generally times tend to err on the side of early detection. If a frequency test is used, detection times increase markedly as motion increased. The drawback is that more memory is required in the detection phase.

Series Method

The third method is series-based and involves the construction of a series representation of the distribution on incoming features. If the distribution becomes significant near points associated with the background, the distribution is reset. If the collection continues too long temporally, a time-out is registered, if accurate timing information is required the time information is represented as a time series and that is collected along with the feature distribution.

The third method is series-based and involves constructing a series representation of the distribution of incoming features. If the distribution becomes significant near points associated with the background, the distribution is reset. If the collection continues too long temporally, a time-out is registered. If accurate timing information is required, the time information is represented as a time series and that is collected, along with the feature distribution.

Further improved performance may be achieved by when an overlapping histogram bin method is used. When a feature falls in a particular bin, both that bin and its immediate neighbours are updated. This smooths the histogram and thus better resolves the peaks that straddle the boundary of adjacent bins, and reduces the effect of noise.

Assuming a reliable background estimate, with a distinct set of target features, all of the above may detect the appearance of a stationary object in a scene containing movement. In the case of very busy scenes, including a time-out test in the histogram methods ensures that a detection is not missed because its features are too infrequent. There is, however, an increase in detection time (up to the time limit) as objects are more frequency obscured. By including timing information in the histogram, one improves the reliability of detection time. But neither histogram frequency or total collection time are sufficiently accurate on their own. Frequency testing along misses detections in busier scenes, and total collection time incurs further false detections and early detections.

Shape Filtering and User Interface

This step is intended to house any post-filtering of the alarm states prior to their arrival at their user interface. Filtering is used to assist in specific size or shape detection occur here.

In brief, a region indicates a detection. The system then checks whether any of the neighbourhoods also registered a detection. If not, the system is reset to indicate an emerging detection. Alternatively, if a very large areas of the image register a detection then a check is performed of whether lighting levels have changed considerably. If so, then those regions are reset.

The above can be understood if one realises that a valid detection comprises at least N adjacent alarm points, thereby reducing the chance of a localised error producing an alarm. Alarms that do not satisfy the premise are set to an intermediate stage, and may be re-alarmed in the next sequence. If neighbouring points lag behind by one or two frames the whole region tends to become a detection at the same time. As such, this type of error-rate filtering may be incorporated into the detection phase altogether eliminating this step, If a number of regions register a detection, a check is made to see if the lighting levels are sufficiently changed. Examples of this may include the sun behind obscured by clouds.

Shape filtering can be designed to relate to the choice of feature type. Various objects such as suitcases or cars may be recognisable by the approximate shape in the detection image. If not, one can resort to processing an incoming image of the detection region.

Algorithms

In the algorithm of Table 1 described above, the "Acquire Image" step is simply performed with the use of a monitoring camera suitable for the application at hand. Table 2 below presents pseudocode for the "Extract Features" step.

TABLE 2

FOREACH subregion (i, j) of the image
  Compute feature,
  Map feature into integer range (eg. 0 . . . 255).

In the algorithm of Table 2, the computed feature may be any feature that can be mapped onto an integer result. This feature is desirably invariant to minor changes in lighting. Also, similar features map onto similar integer values. That is to say, similar features should cluster together once converted to an integer. For example, a suitable feature value is presented in Equation [34] below.

$$F = \text{sum}\_ij(l(i,j) - \text{mean}\_l)/(\text{cum}\_ijl(i,j) + c) \qquad [34]$$

In Equation [34] above, c is a small constant, and the summations are over a small neighbour of the image. The output from this is then rescaled and rounded into an integer range (for example, 0 . . . 255).

Table 3 below presents pseudocode for the "Filter Out Movement" step in the algorithm of Table 1.

TABLE 3

Set movement mask to zero.
FOREACH image subregion (i, j)
  IF feature (i, j) at time t – 1 is drastically different
  to that at time t THEN
    Mark region as containing movement by setting mask (i, j) to 1.
Store current feature values for next iteration.

If feature values vary smoothly then a significant different between frames should indicate the presence of a quite different feature which is most likely associated with a moving object or sudden scene change. If the features do not differ drastically, the features are most likely associated with the same, stationary, object.

Table 4 below presents pseudocode for the "Construct or update background estimate based on features" step of the algorithm of Table 1.

TABLE 4

```
IF first iteration THEN
   Set status of each subregion to 'wait on background'
   Set coefficient of each distribution (i, j) to zero.
   Set counters, etc to zero.
FOREACH image subregion (i, j)
   IF mask (i, j) does not indicate movement THEN
      IF status of subregion dots not indicate a 'detection' THEN
         Update Distribution.
IF complete background estimates does NOT exist
   FOREACH image subregion (i, j)
      IF distribution contains sufficient points THEN
         Find most probable feature (peak in distribution).
         Set background (i, j) to corresponding feature value.
         Change status (i, j) to ready.
      IF All subregions are ready THEN
         Indicate that complete background estimate exists.
   ELSE
      Increment second counter.
      IF second counter > update delay THEN
         FOREACH image subregion (i, j)
            Find most probable feature (i.e. peak in distribution.
            Set background (i, j) to corresponding feature value.
         Reset second counter to zero.
```

The techniques used to "Update distribution" and "Find most probable feature (peak in distribution)" depends upon the technique used to estimate the distribution of feature values over time. Two approaches that can be used involve histograms, or a Fourier Series-based Kernel method.

Tables 5 and 6 respectively present algorithms for "Update distribution" and "Find most probable feature (peak in distribution)" using the histogram approach. Alternate algorithms using the Kernel method are presented below in Tables 7 and 8.

TABLE 5

| 1. | Associate feature value with a histogram bin. |
| 2. | Increment counter for that entry. |
| 3. | IF histogram contains large number of entries THEN Scale down histogram. (NB. This step may be done continuously if REALS are used rather than INTEGERS). |

TABLE 6

| 1. | Find histogram bin with largest count. |
| 2. | RETURN feature value associated with that bin. |

The Kernel method is based upon the Kernel Approach to Density. Rather than using a large number of discrete values to represent the distribution, the distribution can be represented by a Fourier approximation.

The KERNEL used in constructing the distribution can also be represented in this way. Thus, updating the distribution becomes one of adding some proportion of the coefficients of the kernel (shifted with respect to the incoming feature value) with the coefficients of the current density estimate.

To make a background estimate, one simply uses the Fourier approximation to find the feature with maximal probability.

TABLE 7

| 1. | Shift kernel to suite feature value. |
| 2. | New distribution is (1 − k) * "old distribution"+ K * "shifted kernel". |

TABLE 8

| 1. | Current max = 0; |
| 2. | Max val = 0; |
| 3. | FOR feature = first feature value TO last feature value Compute probability of feature using series approximation. IF probability > max val THEN Record max and max val. |
| 4. | RETURN max val. |

The above pseudocode of Tables 7 and 8 incorporates a state space for each image region. The background estimation, detection and filtering modules can use these to alter their behaviour. For example, features of an image region detecting as a change are not fed into the distribution for that region until the state changes (otherwise an update can inadvertently cause the detected object to prematurely become part of the background estimate). Moreover, different actions can be taking place in different areas of the image. The states used here are listed directly below.

1. wait—wait on background estimate.
2. active
3. possible detection—emerging area of suspicion.
4. detection—area is detecting as a background change.
5. wait on reset—wait for user reset or object to leave, (optional)
6. reset—force reset of detection.
7. user decision—force user decision (optional)

Table 9 (on the next page) presents pseudocode for the "Detect stationary objects" step in the algorithm of Table 1.

TABLE 9

```
IF first iteration THEN
   Set detection distributions to zero.
FOREACH image subregion (i,j)
   IF status is 'reset'
      Reset distributino to zero.
      Set status to 'ready'
   IF mask does not indicate movement THEN
      Update detection distribution with incoming feature value.
      IF frequency of background feature in the distribution is
      sufficiently large THEN
         Reset distribution to zero.
         IF status is not 'wait on background' THEN
            Set status to 'ready'.
   ELSE
      IF distribution represents at least half as many image frames
      as the detection time THEN
         IF status is not 'wait' or 'possible detection' THEN
            Change status to 'possible detection'.
         ELSEIF status is 'possible detection'.
            Find characteristics of distribution
            (eg. peak(s) of distribution).
            IF peak (or other measure) exceeds
            Specified limits THEN
               Upgrade status to 'detection'.
            ELSEIF distribution represents more than double
            the detection time THEN
               Set status to either
               'detection' or 'user decision'
```

The background change will not have the same feature values as the background. Thus, by constituting a second distribution and comparing this with the background estimate one can detect such changes shortly after they have occurred. For example, the peak of the second distribution is likely to be different from that of the background distribution.

In the above, areas of possible change are first registered when the background has been obscured for a sufficiently long time (indicated by the size of the distribution). If the background is still present then the distribution will be continually resent, otherwise the distribution will be constructed until it is sufficiently clear that a change has occurred (for example, the peak has moved).

Again various representation of the distribution could be used.

Table 10 below presents pseudocode for the "Filter out spurious detections" step in the algorithm of Table 1.

TABLE 10

FOREACH detection raised
    IF sufficient neighbouring points are also flagging as 'detection' or
       'user decision' THEN
       Confirm alar status.
    ELSE
       Adjust status to 'possible detection'.
IF large regions of the detection area are in 'detection' state THEN
    Report that a significant change has occured to the scene.
    Reduce status to 'possible detection'

The first step is intended to reduce false alarm rate from lone detections. This also has the advantage of delaying early detections by one or two frames so they form clear clusters. The latter test is to check to see if a detection too large to be associated with an object of interest has occurred. For example, if the camera is disturbed or malfunctioning, or if the lighting changes drastically.

Table 11 below presents pseudocode for the "Look for required detection shapes" step in the algorithm of Table 1.

TABLE 11

Group detection areas into blocks.
IF depth map available THEN
    Adjust for distance.
Compare blocks with shape template(s).
If sufficiently close match present THEN
    Register presence of object.
Reset non-matching regions to 'possible detection'.

The idea here is that a "template" would be a binary representation of how a shape, such as a suitcase, would appear in the image.

Table 12 below presents pseudocode for the "User Interface" step in the algorithm of Table 1.

TABLE 12

Display Status
IF 'detection' or 'user decision' present
  Query User Regarding Action.
  If action is reset THEN
    Set status of all 'alarm'/'user decision' regions to 'reset'.
  ELSEIF action is ignore
    Update background distribution and background estimate
    based on the
      detection distribution.
    Set status of all 'alarm'/'user decision' regions to 'wait on
    background' (or
      'reset' if detection in those areas should continue ASAP).
  ESLEIF action is wait
    Set status to 'wait on reset'.

TABLE 12-continued

ELSEIF action is restart system
  Reset all distributions.
  Set all region status to 'wait'.

The above-discussed techniques provide an indication of changes in the background scene that are sometimes even not observable by a human operator. Actual system requirements, though, may need to be adapted for particular applications.

System adaptation is certainly required where, for example, the system is used outside in direct sunlight, the video cameras have to incorporate auto-iris functions to ensure that the individual pixels recorded are not saturated. The auto-iris function automatically adjusts the brightness to compensate for this increased luminosity, although the overall measured distribution of the individual values is still likely to be affected. Further, any camera movements of the order of a pixel may corrupt estimates of the distribution over time of the intensity of an individual pixel.

To compensate for gradual scene changes over time, once the initial background estimate is made, the background histograms may continue to be updated, and the background estimates altered as appropriate. This must be done on a much longer timescale than the desired detection period.

Computer Hardware and Software

Figure 8:
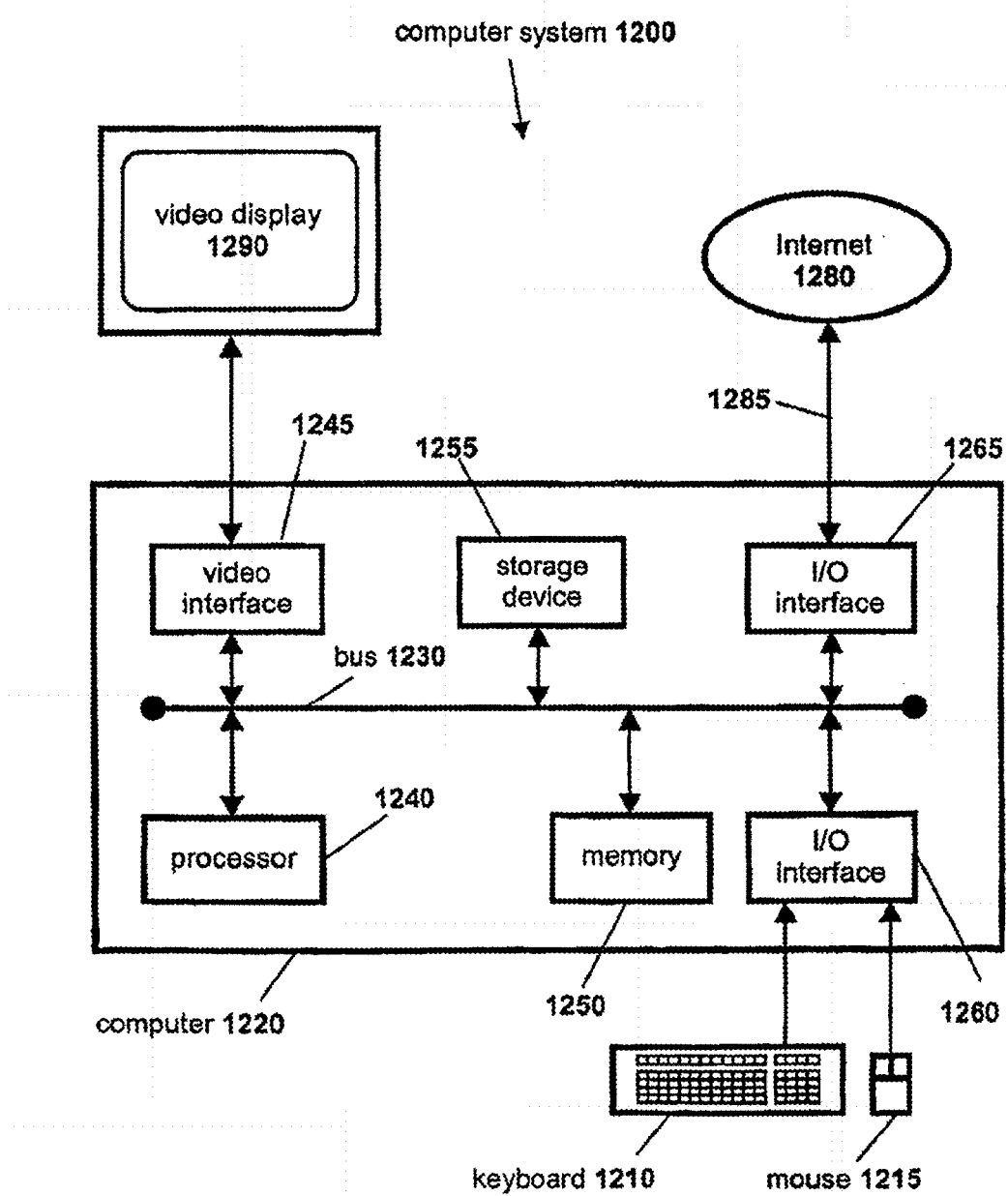
FIG. 8 is a schematic diagram representing a computer system that may be used to implement embodiments of the invention.

FIG. 8 is a schematic representation of a computer system 1200 that can be used to implement the techniques described herein. Computer software executes under a suitable operating system installed on the computer system 1200 to assist in performing the described techniques. This computer software is programmed using any suitable computer programming language, and may be thought of as comprising various software code means for achieving particular steps.

The components of the computer system 1200 include a computer 1220, a keyboard 1210 and mouse 1215, and a video display 1290. The computer 1220 includes a processor 1240, a memory 1250, input/output (I/O) interfaces 1260, 1265, a video interface 1245, and a storage device 1255. The processor 1240 is a central processing unit (CPU) that executes the operating system and the computer software executing under the operating system. The memory 1250 includes random access memory (RAM) and read-only memory (ROM), and is used under direction of the processor 1240. The video interface 1245 is connected to video display 1290 and provides video signals for display on the video display 1290. User input to operate the computer 1220 is provided from the keyboard 1210 and mouse 1215. The storage device 1255 can include a disk drive or any other suitable storage medium.

Each of the components of the computer 1220 is connected to an internal bus 1230 that includes data, address, and control buses, to allow components of the computer 1220 to communicate with each other via the bus 1230.

The computer system 1200 can be connected to one or more other similar computers via an input/output (I/O) interface 1265 using a communication channel 1285 to a network, represented as the Internet 1280.

The computer software may be recorded on a portable storage medium, in which case, the computer software program is accessed by the computer system 1200 from the storage device 1255. Alternatively, the computer software can be accessed directly from the Internet 1280 by the computer 1220. In either case, a user can interact with the computer system 1200 using the keyboard 1210 and mouse 1215 to operate the programmed computer software executing on the computer 1220.

Other configurations or types of computer systems can be equally well used to implement the described techniques. The computer system 1200 described above is described only as an example of a particular type of system suitable for implementing the described techniques.

CONCLUSION

The word "comprise" (and variations such as "comprises" or "comprising") is used in the description and claims in an inclusive sense (i.e. to specify the presence of the stated features but not to preclude the presence or addition of further features), except where the context requires otherwise due to express language or necessary implication It will be appreciated by persons skilled in the art that numerous variations and/or modification may be made to the invention as shown in the specific embodiments without departing from the scope of spirit or scope of the invention broadly described. The present embodiments are, therefore, to be considered in all respects as illustrative and not restrictive.

Further, any reference herein to prior art is not intended to imply that such prior art forms or formed a part of the common general knowledge in Australia or any other country.

The invention claimed is:

1. An automated surveillance system comprising:
 a computing system arranged to receive a plurality of surveillance feeds from a surveillance network, each of the surveillance feeds having a geospatial reference tag that identifies a corresponding surveillance location,
 a profiling engine that detects characteristics of the surveillance feeds that are indicative of categorized events and classifies the identified characteristics in event records, and
 a response module that determines a response reaction to events documented in event records using a response index allocated to corresponding event categories;
 a cognition engine, the cognition engine configured to evaluate the relationships between at least two events to determine whether the events are sufficiently correlated to be attributed to the same incident; and
 combining events attributed to the same incident into an incident report.

2. The system of claim 1 wherein the cognition engine derives each of the incident reports from event combinations that are indicative of predefined incidents.

3. The system of claim 2 comprising a response evaluation engine that determines response reactions for incident reports using a response index allocated to the predefined incident.

4. The system of claim 1 comprising a supervision module that samples the surveillance feeds and generates temporal characteristic profiles, the supervision module transferring the temporal characteristic profiles being to the profiling engine.

5. The system of claim 1 comprising a command module that monitors the geospatial position of a plurality of designated response units and nominates response units that satisfy the response reaction determined by the response module based on proximity to a corresponding surveillance location.

6. The system of claim 5 comprising a dispatch module that monitors response unit availability and dispatches response instructions to available response units nominated by the command module.

7. The system of claim 1 comprising a prioritization module that assesses current event records and assigns a prioritization rating to pending response reactions, the prioritization rating defining a response priority for a corresponding event, the prioritization module deriving the prioritization rating from the response index allocated to a corresponding event category.

8. The system of claim 1 comprising a network interface that receives surveillance feeds from a plurality of surveillance nodes within the surveillance network.

9. The system of claim 1 comprising a tracking engine that identifies response units in the geographical vicinity of designated surveillance locations.

10. The system of claim 1 wherein the cognition engine evaluates relationships between events using evaluation parameters.

11. The system of claim 1 wherein the cognition engine generates a correlation index between independent events and compares the correlation index for a set of events to a predetermined threshold to determine if events are sufficiently correlated to be attributed to the same incident.

12. An automated response process comprising:
 a computing system receiving a plurality of surveillance feeds from a surveillance network, each of the surveillance feeds having a geospatial reference tag that identifies a corresponding surveillance location,
 the computing system detecting characteristics of the surveillance feeds that are indicative of categorized events and classifying the identified characteristics in event records, the computing system determining a response reaction to events documented in event records using a response index allocated to corresponding event categories and identifying response units in the vicinity of corresponding surveillance locations that are capable of responding to the events,
 the computing system evaluating the relationships between at least two events to determine whether the events are sufficiently correlated to be attributed to the same incident; and
 combining events attributed to the same incident into an incident report.

13. The process of claim 12 comprising the computing system generating incident reports from combinations of events documented in the event records, each of the incident reports being derived from event combinations that are indicative of predefined incidents.

14. The process of claim 13 comprising the computing system determining response reactions for incident reports using a response index allocated to the predefined incident.

15. The process of claim 12 comprising the computing system sampling the surveillance feeds and generating temporal characteristic profiles.

16. The process of claim 12 comprising the computing system monitoring the geospatial position of a plurality of designated response units and nominating potential response units that satisfy the response reaction determined for an event based on proximity to a corresponding surveillance location.

17. The process of claim 16 comprising the computing system monitoring response unit availability and dispatching response instructions to nominated response units that are available.

18. The process of claim 12 comprising the computing system assessing current event records and assigning a prioritization rating to pending response reactions, the prioritization rating being derived from the response index allocated to a corresponding event category and defining a response priority for a corresponding event.

19. The process of claim 12 wherein the step of evaluating relationships between events is performed using evaluation parameters.

20. The process of claim 12 comprising the further step of generating a correlation index between independent events and comparing the correlation index for a set of events to a predetermined threshold to determine if events are sufficiently correlated to be attributed to the same incident.

21. An automated response method comprising a computing system generating an incident report from a plurality of individual events detected in a surveillance feed, and the computing system determining a response reaction to the incident report,
the computer system configured to evaluate the relationships between at least two events to determine whether the events are sufficiently correlated to be attributed to the same incident; and
combining events attributed to the same incident into an incident report.

22. The method of claim 21 comprising the computing system receiving a geospatial reference tag that identifies a surveillance location for a corresponding surveillance feed.

23. The method of claim 21 comprising the computing system detecting characteristics of the surveillance feed that are indicative of categorized events and classifying the identified characteristics in event records.

24. The method of claim 21 comprising the computing system monitoring the geospatial position of a plurality of designated response units and selecting potential response units that satisfy the response reaction based on proximity to a corresponding surveillance location.

25. The method of claim 21 comprising the computing system sampling the surveillance feed and generating temporal characteristic profiles.

26. The method of claim 21 comprising the computing system generating individual incident reports from combinations of events that are indicative of predefined incidents.

27. The method of claim 26 comprising the computing system assigning each of the incident reports a prioritization rating that is derived from a response index allocated to a corresponding predefined incident, the prioritization rating defining a response priority for the incident.

28. An automated surveillance system comprising a computing system arranged to receive a plurality of surveillance feeds from a surveillance network, and having an analysis engine arranged to aggregate and analyse information from a plurality of surveillance feeds to determine one or more incidents, and to determine a response to the one or more incidents,
the one or more incidents containing at least one event detected in a surveillance feed, the system evaluating the relationships between at least two events to determine whether the events are sufficiently correlated to be attributed to the same incident; and
combining events attributed to the same incident into an incident report.

29. The system of claim 28 comprising a profiling engine that detects characteristics of the surveillance feeds that are indicative of categorized events and classifies the characteristics in event records.

30. The system of claim 29 comprising a response module that determines a response to events documented in event records and identifies response units in the vicinity of a corresponding surveillance location.

31. The system of claim 29 comprising a supervision module that samples the surveillance feeds and generates temporal characteristic profiles, the supervision module transferring the temporal characteristic profiles to the profiling engine.

32. The system of claim 29 comprising a command module that monitors the geospatial position of a plurality of designated response units and nominates response units capable of responding to the one or more incidents based on proximity to a surveillance location.

33. The system of claim 32 comprising a dispatch module that monitors response unit availability and dispatches response instructions to available response units nominated by the command module.

34. The system of claim 29 comprising a prioritization module that assesses current event records and assigns a prioritization rating to pending responses, the prioritization rating defining a response priority for a corresponding event, the prioritization module deriving the prioritization rating from a response index allocated to a corresponding event category.

35. The system of claim 28 comprising a cognition engine that generates incident reports from combinations of events documented in the event records, each of the incident reports being derived from event combinations that are indicative of predefined incidents.

36. The system of claim 35 comprising a response evaluation engine that determines response reactions for incident reports using a response index allocated to the predefined incident.

* * * * *